(12) United States Patent  (10) Patent No.: US 7,767,916 B2
Kurihara et al.  (45) Date of Patent: Aug. 3, 2010

(54) SWITCH DEVICE

(75) Inventors: Masayuki Kurihara, Aichi (JP); Seiji Ishigaki, Aichi (JP); Masahiko Miyata, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 524 days.

(21) Appl. No.: 11/811,545

(22) Filed: Jun. 11, 2007

(65) Prior Publication Data

US 2008/0000762 A1  Jan. 3, 2008

(30) Foreign Application Priority Data

Jun. 30, 2006  (JP) .............................. 2006-182025

(51) Int. Cl.
*H01H 9/00* (2006.01)
*H01H 43/10* (2006.01)
(52) U.S. Cl. .................. 200/38 R; 200/565; 340/407.2; 335/194; 74/10.41
(58) Field of Classification Search ......... 335/205–207, 335/194; 200/38 R, 565; 340/407.1, 407.2; 188/161–164; 74/10.41
See application file for complete search history.

(56) References Cited

U.S. PATENT DOCUMENTS 7,019,238 B2 * 3/2006 Kobayashi .................. 200/310

FOREIGN PATENT DOCUMENTS

| EP | 1217496 A2 * | 6/2002 |
| JP | 11182531 A * | 7/1999 |
| JP | 2003-086059 | 3/2003 |
| JP | 2004-022301 | 1/2004 |
| JP | 2004-220957 | 8/2004 |

* cited by examiner

*Primary Examiner*—Ramon M Barrera
(74) *Attorney, Agent, or Firm*—Patterson Thuente Christensen Pedersen, P.A.

(57) ABSTRACT

A switch device that adjusts tactile sensation of a switch knob without control delay. The switch device includes a knob operated to switch an actuation state of an apparatus. A click mechanism is connected to the knob and includes a recess and a projection. Engagement of the projection and the recess provides a tactile sensation to a person operating the knob when the knob is operated. An adjustment mechanism generates a magnetic field to adjust tactile sensation of the click mechanism.

17 Claims, 21 Drawing Sheets

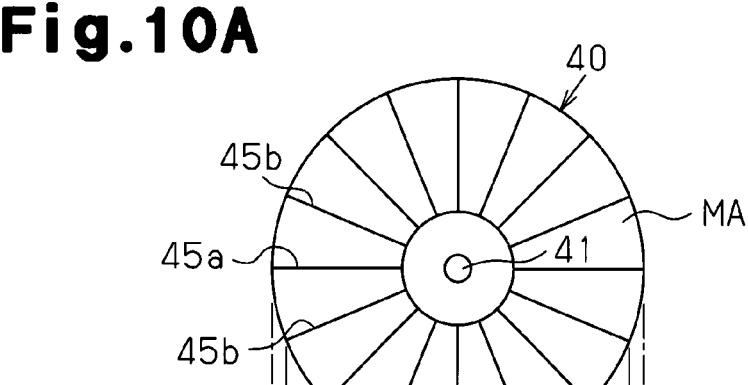
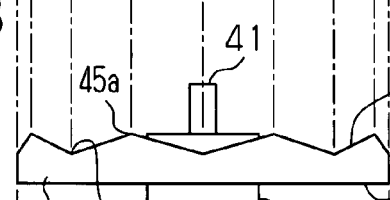
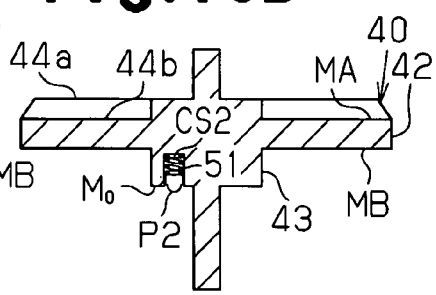
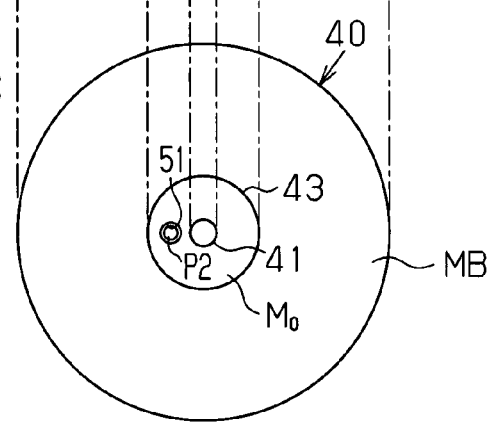

Fig.16A
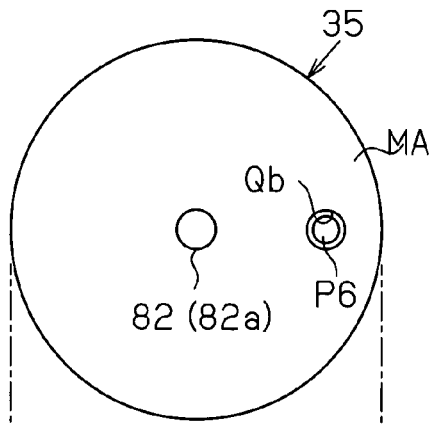
Fig.16B
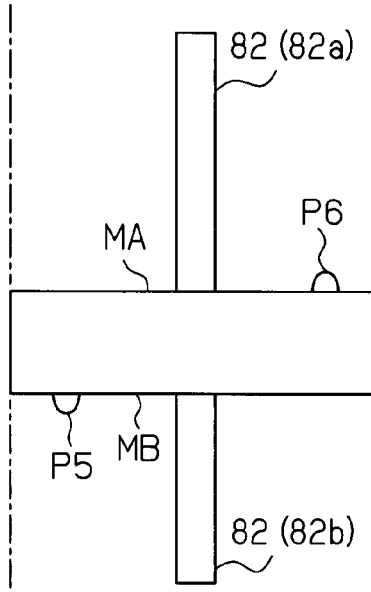
Fig.16C
Fig.16D
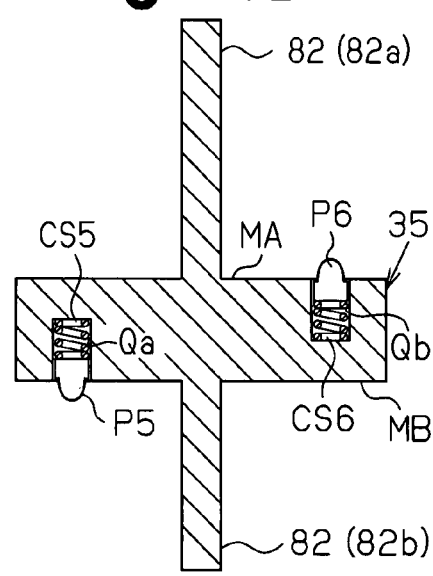
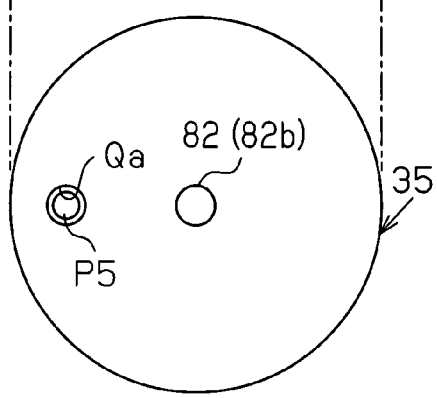

SWITCH DEVICE

CROSS-REFERENCE TO RELATED APPLICATIONS

This application is based upon and claims the benefit of priority from prior Japanese Patent Application No. 2006-182025, filed on Jun. 30, 2006, the entire contents of which are incorporated herein by reference.

BACKGROUND OF THE INVENTION

The present invention relates to a switch device operated to actuate various apparatuses.

A rotary switch is typically rotated to activate, inactivate, or change the control amount of an apparatus. Japanese Laid-Open Patent Publication Nos. 2004-22301, 2004-220957, and 2003-086059 describe conventional rotary switches. A conventional rotary switch includes a click mechanism for ensuring a reliable switching operation or for providing an operator with a tactile sensation. For example, a mechanical click mechanism may have recesses formed on a fixed member of a rotary switch and a projection formed on a rotary member of the switch. A resistance is generated when the projection, which is engaged with one of the recesses, moves to an adjacent one of the recess. The resistance is perceived as a tactile sensation by the person operating the switch.

The rotary switch may be used to operate a device that displays various menu screens (input screens) for function selection, such as a navigation system. The number of items that can be selected on each menu screen usually differs depending on each menu screen. However, the function selection on each menu screen is required to be executable by operating the single rotary switch. Therefore, a variable tactile sensation mechanism (click mechanism) has been proposed. The variable tactile sensation mechanism changes the number of times clicks are generated (number of times the operator receives a resistance) per operation angle unit of the rotary switch for each menu screen.

One example of a variable tactile sensation mechanism is an electric click mechanism. The electric click mechanism includes a motor, which is connected to a switch knob of a rotary switch directly or via a transmission mechanism, for electrically providing the switch knob with a click using the drive force of the motor. When the rotary switch is operated, the electric click mechanism varies the generated resistance by changing the amount of current flowing through the motor. For example, when an input screen is displayed on a car navigation system for selecting buttons or icons, a relatively large resistance is generated for the operation of the rotary switch. This ensures that a switch operation is performed. When the car navigation system displays a screen for inputting data, a relatively small resistance is generated for the operation of the rotary switch. This enables smooth input of data.

However, the variable tactile sensation mechanism using the motor may have the following problem. The variable tactile sensation mechanism may have a response delay when the switch knob that has been rotated in one direction is rotated in the opposite direction. More specifically, inertial force is produced when a rotor is being rotated in a motor. When the switch knob is rotated in the opposite direction, the inertial force would interfere with immediate reversing of the rotor rotating direction. This generates a time delay before the motor starts generating rotation in the reverse direction. Thus, a time delay also occurs before a click is generated for the reversed rotation of the switch knob. In this manner, a control delay or a response delay may occur when the switch knob is operated if the variable tactile sensation mechanism uses a motor.

Further, when the motor is connected to the switch knob by a transmission mechanism, such as a gear or a wire, backlash of the gear or expansion of the wire may interfere with direct transmission of the motor drive force to the switch knob when the switch knob is rotated. This may also delay control of the switch knob. Further, the transmission mechanism may rattle the switch knob or lower the rigidity of the switch knob. In addition, the space occupied by the motor and the transmission mechanism may increase the size of the switch.

SUMMARY OF THE INVENTION

It is an object of the present invention to provide a switch device that adjusts the tactile sensation of a switch knob without a control delay.

One aspect of the present invention is a switch device for use by a person with an apparatus having an actuation state. The switch includes a knob operable for switching the actuation state of the apparatus. A click mechanism is connected to the knob and includes a recess and a projection. Engagement of the projection and the recess provides a tactile sensation to the person operating the knob when the knob is operated. An adjustment mechanism generates a magnetic field to adjust the tactile sensation of the click mechanism.

A further aspect of the present invention is a rotary switch device including a case, a rotary knob and a shaft rotatable together with the rotary knob. A first rotation member is connected to the shaft, arranged in the case, and rotatable integrally with the shaft. A second rotation member facing the first rotation member is arranged coaxially with the first rotation member in the case. An electromagnet is fixed to the case and magnetically restrains the second rotation member when activated to prohibit rotation of the second rotation member. A click mechanism, arranged between the first rotation member and the second rotation member, generates resistance force that provides a tactile sensation via the rotary knob when the rotary knob is operated. The click mechanism enables the second rotation member to rotate together with the first rotation member when the electromagnet is inactivated. The click mechanism permits the first rotation member to rotate relative to the second rotation member when an external force exceeding the resistance force of the click mechanism is applied to the first rotation member when the electromagnet is activated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 10A, 10B, 10C, and 10D are respectively a plan view, a side view, a bottom view, and a cross-sectional view of a click generation unit in the third embodiment;

FIGS. 16A, 16B, 16C, and 16D are respectively a plan view, a side view, a bottom view, and a cross-sectional view of a click generation unit in the sixth embodiment;

DETAILED DESCRIPTION OF THE PREFERRED EMBODIMENTS

A switch device 1 according to a first embodiment of the present invention will now be described with reference to FIGS. 1 to 5.

Figure 1:
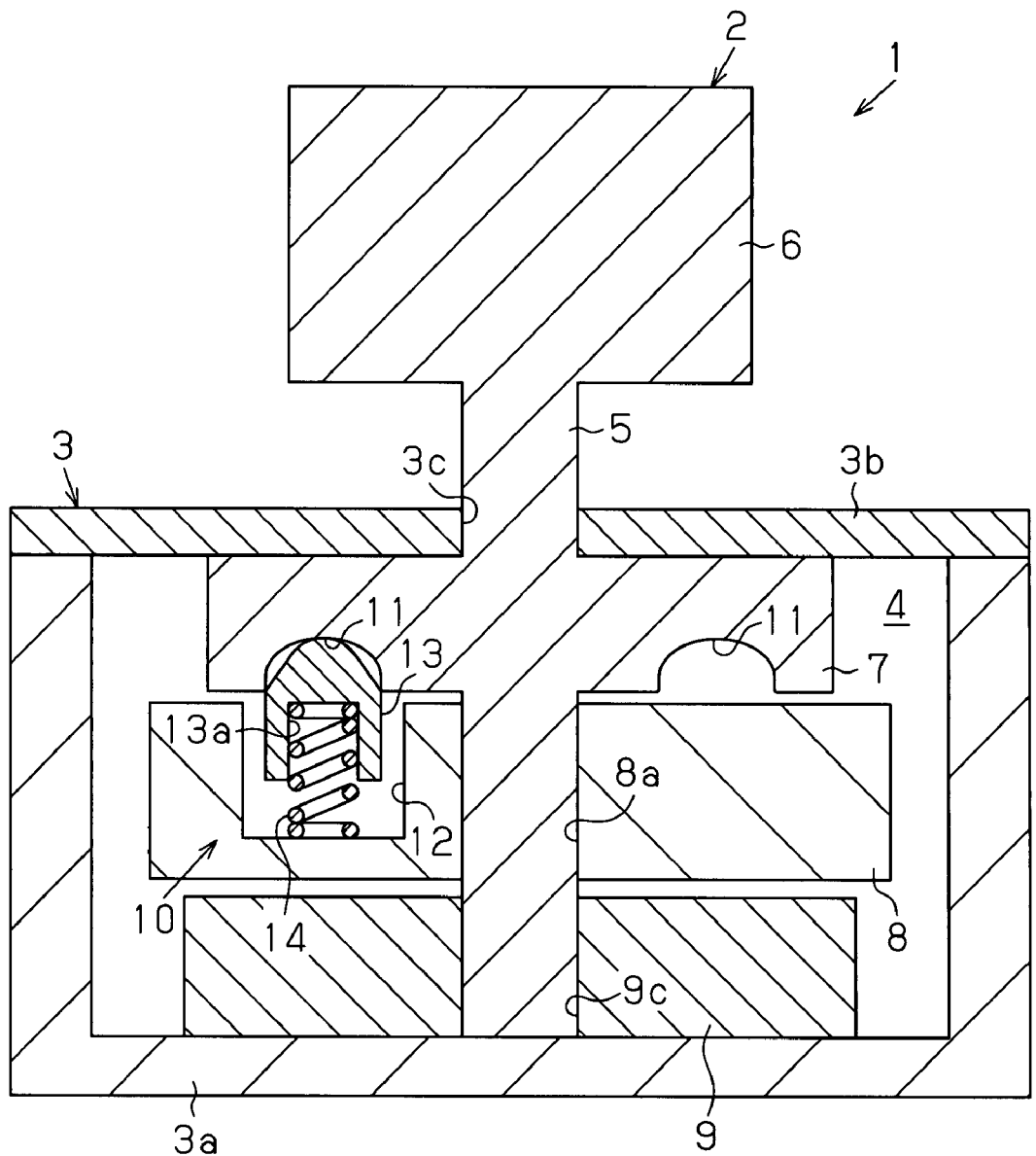
FIG. 1 is a cross-sectional view of a switch device according to a first embodiment of the present invention.
Figure 2:
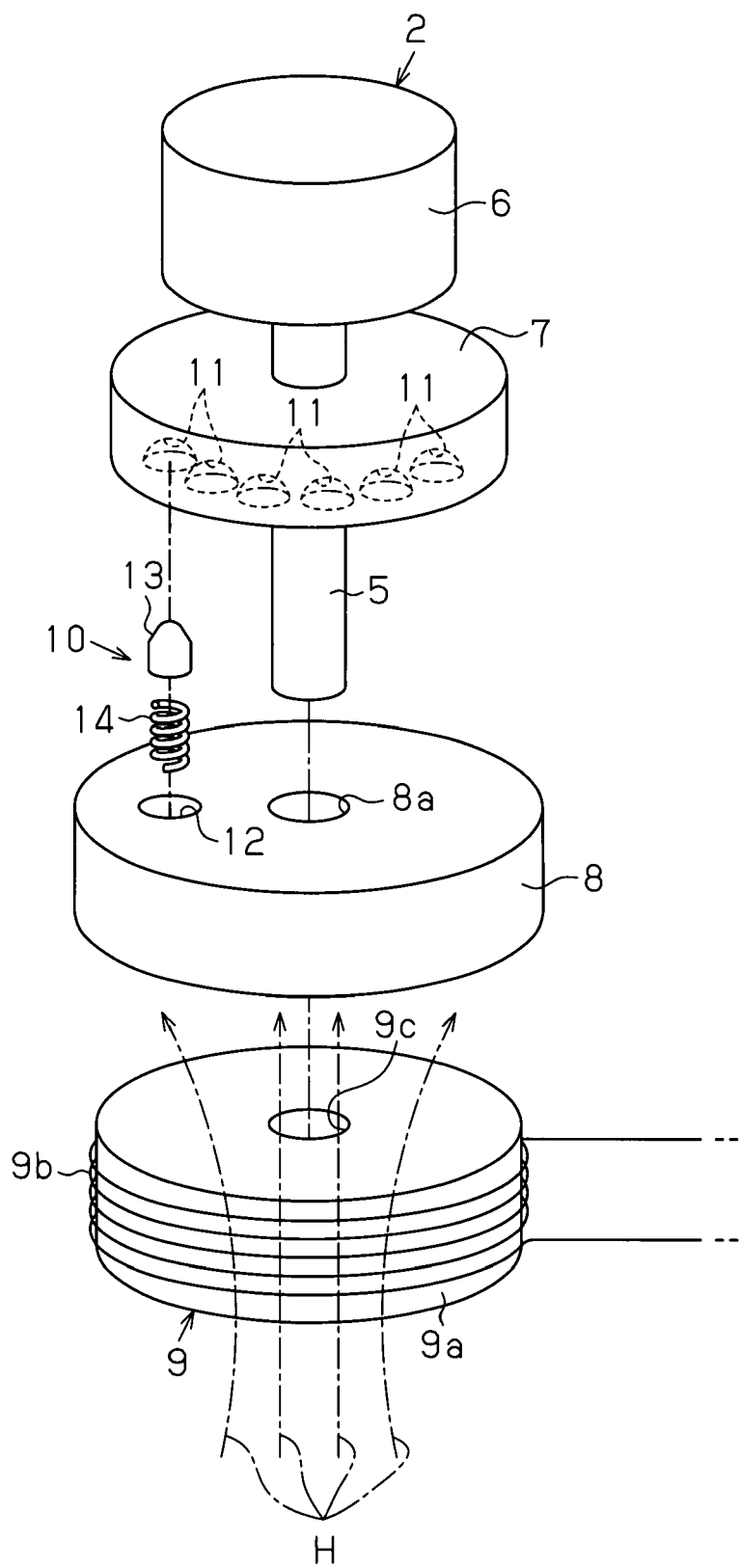
FIG. 2 is an exploded perspective view showing the main parts of the switch device.

The switch device 1 shown in FIGS. 1 and 2 is used, for example, to operate a car navigation system arranged in a center cluster of a vehicle (not shown). The switch device 1 includes one or more rotary knobs 2 (only one rotary knob is shown in FIGS. 1 and 2). Each rotary knob 2 is a rotary switch rotated to operate a car navigation system.

The switch device 1 includes a case 3 which is attached to a frame of the car navigation system. The case 3 includes a box 3a and a lid 3b. The case 3 defines a chamber 4 for accommodating various components of the switch device 1.

The case 3 rotatably supports the rotary knobs 2. Each rotary knob 2 includes a shaft 5 and a head 6. The head 6 of each rotary knob 2 is exposed from the case 3. The shaft 5 of each rotary knob 2 is rotatably inserted through a hole 3c formed in the center of the lid 3b.

A disk-shaped click generation unit 7 is formed integrally with the shaft 5 of each rotary knob 2 near the head 6 in the chamber 4. The click generation unit 7 is formed coaxially with the shaft 5. The click generation unit 7 abuts against a rear surface of the lid 3b to prevent the rotary knob 2 from falling off the case 3.

A disk-shaped support 8 is arranged to face the click generation unit 7 in the chamber 4. The support 8 is formed from a magnetic material. The shaft 5 of the rotary knob 2 is inserted through a central insertion hole 8a of the support 8 in a manner rotatable relative to the support 8. The support 8 functions as an adjustment mechanism and a magnetic body.

An electromagnet 9, which is a generally round plate, is arranged in the chamber 4 opposite to the click generation unit 7. The electromagnet 9 has a circular cylindrical core 9a (refer to FIG. 2) and a coil 9b wound around the core 9a (refer to FIG. 2). The core 9a has a central hole 9c. The shaft 5 of the rotary knob 2 has a distal end inserted through the central hole 9c in a manner rotatable to the core 9a. The electromagnet 9 faces the support 8.

When current flows through the coil 9b, the electromagnet 9 generates a magnetic field H that extends through the coil 9b (in directions indicated by arrows drawn in broken lines in FIG. 2). The magnetic field H attracts the support 8, which is formed from the magnetic material. The support 8 is attracted more strongly to the electromagnet 9 as the magnetic field H strengthens. The support 8 is attracted less strongly by the electromagnet 9 as the magnetic field H of the electromagnet 9 weakens. The electromagnet 9 functions as an adjustment mechanism.

As shown in FIGS. 1 to 4, a click mechanism 10 is arranged between the click generation unit 7 and the support 8. The click mechanism 10 provides a tactile sensation (click feel or resistance feel) to the person operating the rotary knob 2 when the rotary knob 2 is operated. The click mechanism 10 will now be discussed. A plurality of semispherical dimples 11 are formed on a rear surface of the click generation unit 7 at positions outward in the radial direction. The dimples 11 are arranged at substantially equal intervals in the circumferential direction of the click generation unit 7.

A plunger 13 is arranged on the support 8. The plunger 13 is retrieved in a receptacle 12 formed in the surface of the support 8. The plunger 13 has a semispherical distal end. A coil spring 14 biases the plunger 13 toward the click generation unit 7. The plunger 13 includes a coil spring seat 13a (refer to FIG. 1). The coil spring 14 is arranged in the coil spring seat 13a. The dimples 11 function as recesses. The plunger 13 functions as a projection.

Figure 3:
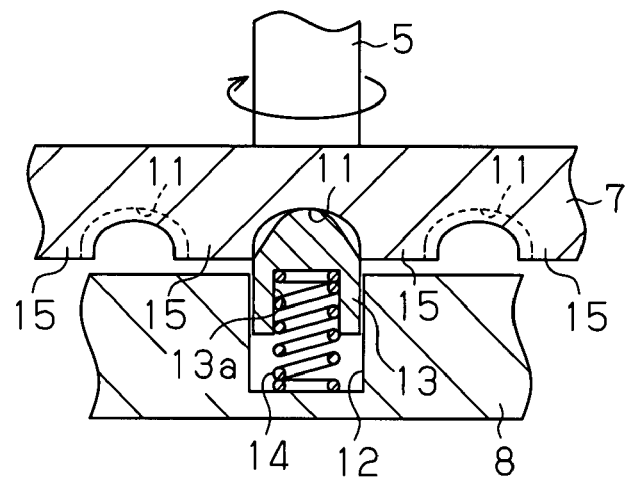
FIG. 3 is a cross-sectional view of a plunger engaged with a recess.
Figure 4:
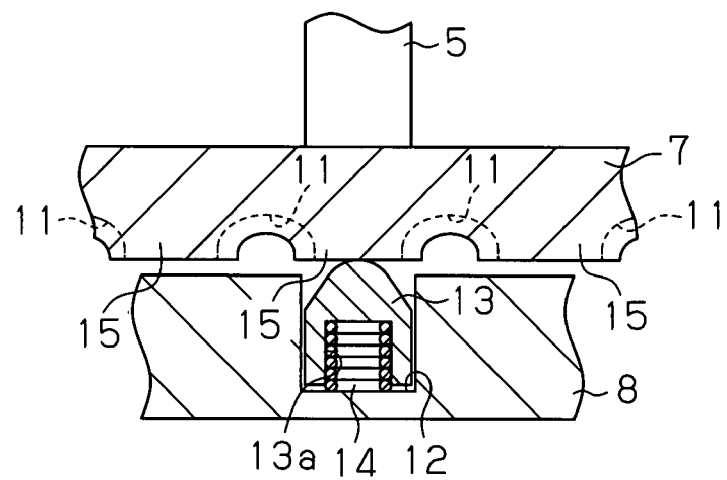
FIG. 4 is a cross-sectional view of the plunger moving over a ridge.

In FIG. 3, the plunger 13 is engaged with one of the dimples 11. When the rotary knob 2 rotates from this state in the direction indicated by an arrow in FIG. 3, the plunger 13 is forced into the receptacle 12 against the biasing force applied by the coil spring 14. The plunger 13 is then moved over a ridge 15 formed between the dimple 11 and the adjacent one of the dimples 11 (refer to FIG. 4). Operational force, or resistance force, required to move the plunger 13 over the ridge 15 is transmitted to an operator by the rotary knob 2 as a tactile sensation, or a click. When the rotary knob 2 is further rotated until the plunger 13 faces the adjacent dimple 11, the plunger 13 is popped out of the receptacle 12 by the biasing force of the coil spring 14. This engages the plunger 13 with the dimple 11. The movement of the plunger 13 over a ridge 15 for engagement with an adjacent dimple 11 is repeated until the rotation of the rotary knob 2 is stopped.

When the electromagnet 9 is inactivated, the support 8 is not attracted to the electromagnet 9. Rotation of the rotary knob 2 in this state rotates the support 8 together with the click generation unit 7. The plunger 13 is kept engaged with a dimple 11 of the click generation unit 7 and does not move over any ridge 15. In this case, the operation of the rotary knob 2 does not produce a click.

When the electromagnet 9 is activated, the electromagnet 9 generates the magnetic field H, which attracts the support 8 and prohibits rotation of the support 8. Rotation of the rotary knob 2 in this state rotates the click generation unit 7 but does not rotate the support 8 does not rotate. Thus, the plunger 13 moves over a ridge 15 of the click generation unit 7. The operation of the rotary knob 2 is generates resistance as the plunger 13 moves over a ridge 15. The operator perceives the resistance as a click.

Figure 5:
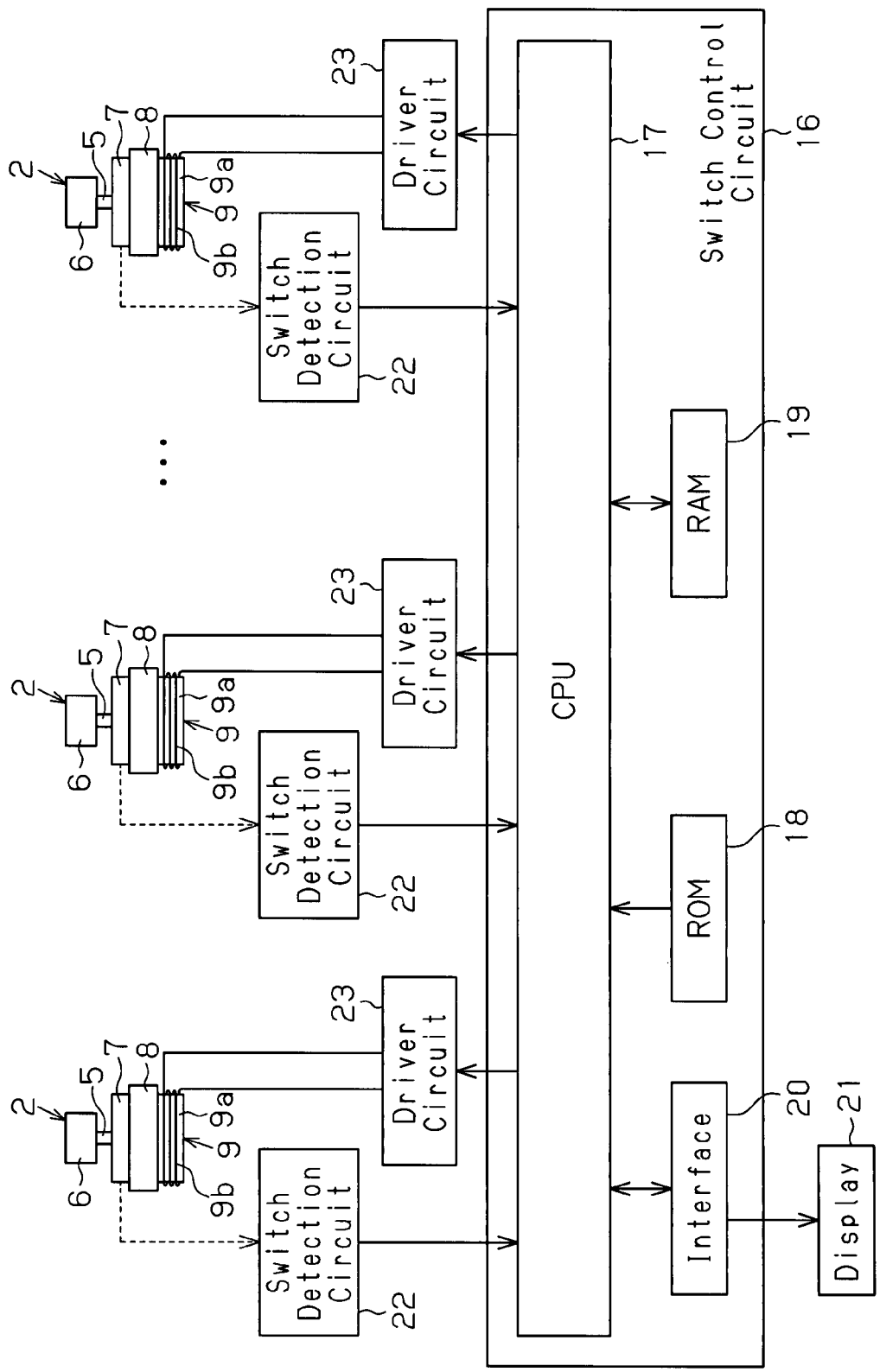
FIG. 5 is a block diagram of an electric circuit of the switch device.

The electric circuit of the switch device 1 will now be described with reference to FIG. 5. The switch device 1 includes a switch control circuit 16 for controlling actuation of the switch device 1. The switch control circuit 16 includes a central processing unit (CPU) 17, a read only memory (ROM) 18, a random access memory (RAM) 19, and an interface 20. The CPU 17 is connected to a drive circuit 23 and a switch detection circuit 22 associated with each rotary knob 2. The rotary knob 2 is connected between the drive circuit 23 and the switch detection circuit 22. The CPU 17 is connected to a display 21 of the car navigation system via the interface 20. The CPU 17 controls each electromagnet 9 or the display 21 using the RAM 19 as a work area based on various programs stored in the ROM 18. The CPU 17 functions as a control means.

The ROM 18 stores a control program executed by the CPU 17 to operate the car navigation system. The switch detection circuit 22 detects operation of the associated rotary knob 2, and provides the CPU 17 with a switch detection signal. The CPU 17 operates in accordance with the control program stored in the ROM 18 and the switch detection signal. For example, the CPU 17 controls the display 21 of the car navigation system to display a screen selected in accordance with the operation of the rotary knob 2. The screen displayed by the display 21 is for an actuation mode.

An example of an operation of the switch device 1 will now be described.

First, when a power supply button (not shown) of the car navigation system is pushed, the car navigation system is activated. The display 21 displays an initial screen. The CPU 17 controls each drive circuit 23 to supply a predetermined amount of current to the coil 9b of the corresponding electromagnet 9. This causes the electromagnet 9 to generate the magnetic field H with a strength that is in accordance with the current. In this case, the support 8 is attracted by the electromagnet 9, and rotation of the support 8 is prohibited. In this state, clicks are produced by the click mechanism 10 when the corresponding rotary knob 2 is operated.

When the rotary knob 2 is operated to select a first menu from the initial screen of the display 21, the display 21 displays a first menu screen. Selection of the first menu screen causes the CPU 17 to activate the electromagnet 9. Thus, the electromagnet 9 attracts the support 8 and prohibits rotation of the support 8. In this state, the operation of the rotary knob 2 produces clicks with the click mechanism 10.

When the rotary knob 2 is operated to select a second menu, the display 21 displays a second menu screen. The CPU 17 instructs the drive circuit 23 to suspend the supply of current to the coil 9b. This frees the support 8 from the attraction of the electromagnet 9. When the rotary knob 2 is operated, the support 8 engaged with the click generation unit 7 rotates together with the click generation unit 7. In this state, the click mechanism 10 does not produce clicks even if the rotary knob 2 is operated.

In this manner, this structure varies the clicks that are produced when the rotary knob 2 is operated in accordance with the screen on the display 21. Thus, even when the rotary knob 2 is commonly used for operation on a plurality of screens, the clicks of the rotary knob 2 is optimally set for each screen. This improves the operability of the rotary knob 2, and reduces erroneous input of data or erroneous selection of display buttons.

Further, the method for varying the tactile sensation of the rotary knob 2 with the motor results in delays caused by the inertial force of a rotor of the motor. However, the method for varying the tactile sensation of the rotary knob 2 with the electromagnet 9 does not generate such a delay. Thus, the method using the electromagnet 9 enables the rotary knob 2 to produce clicks with a quicker response. Accordingly, the method using the electromagnet 9 has less control delays when producing clicks for the rotary knob 2, and the method using the electromagnet 9 provides an optimum tactile sensation of the rotary knob 2.

Further, when the drive force of the motor is transmitted to the rotary knob 2 via a transmission mechanism such as a wire or a gear, the method for varying the tactile sensation of the rotary knob 2 with the motor may result in control delays caused by backlash of the gear or expansion of the wire. The first embodiment does not include such a transmission mechanism and thus does not have such control delays caused by a transmission mechanism. Further, since there is no transmission mechanism, rattling does not occur and the rigidity of the switch device 1 is not affected. Additionally, space that would be occupied by the motor and the transmission mechanism is not necessary. This enables the switch device 1 to have a smaller size.

The first embodiment has the advantages described below.

(1) The magnetic method using the electromagnet 9 produce clicks when the rotary knob 2 is operated. This method does not generate delays when producing clicks, whereas delays are produced when producing clicks with a motor. Further, without the need to use a transmission mechanism such as a gear and a wire, the magnetic method further prevents control delays that would be caused by backlash of the gear and expansion of the wire.

(2) When a transmission mechanism, such as a gear and a wire, is used, mechanical dimensions of the transmission mechanism may cause rattling in the switch device or lower the rigidity of the apparatus. Without the need of a transmission mechanism, the magnetic method using the electromagnet 9 prevents rattling of the switch device 1 and does not lower the rigidity of the switch device 1.

(3) The electromagnet 9, which occupies a smaller space than the motor or the transmission mechanism, is used to vary the tactile sensation of the rotary knob 2. This enables the switch device 1 to have a smaller size.

(4) The structure using the electromagnet 9 to attract the support 8, which is made from a magnetic body, is simple and inexpensive.

(5) The rotary switch device 1 is operated by rotating the knob. As compared, for example, with a slide switch device requiring a relatively large space for a sliding lever, the rotary switch device 1 occupies a small space. This enables further reduction in the size of the switch device 1.

(6) The tactile sensation of the rotary knob 2 is switched in accordance with the screen displayed on the display 21.

A switch device 1A according to a second embodiment of the present invention will now be described with reference to FIGS. 6 to 8.

Figure 6:
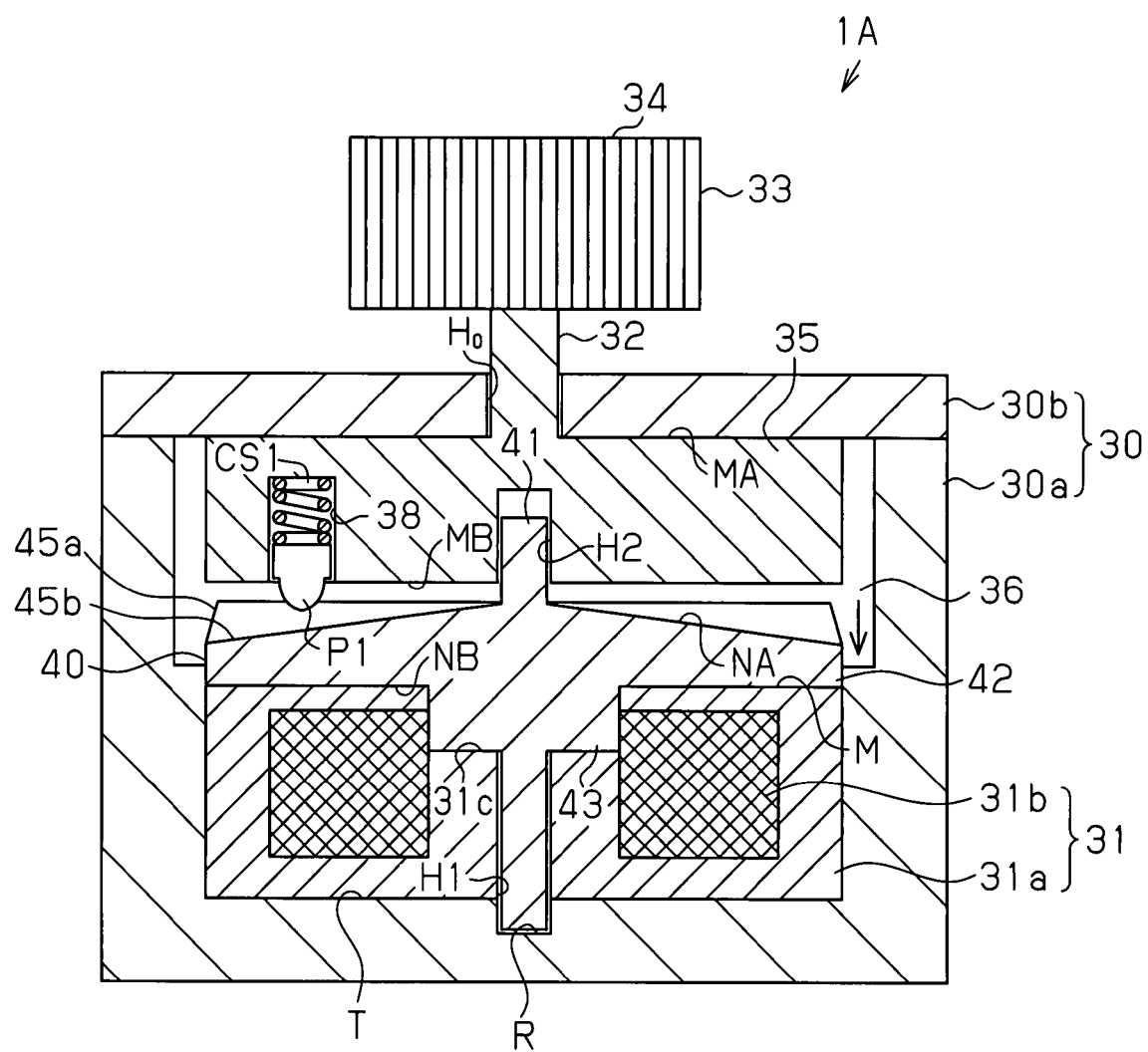
FIG. 6 is a cross-sectional view of a switch device according to a second embodiment of the present invention.

As shown in FIG. 6, a switch device 1A of the second embodiment is a rotary switch for operating a car navigation system as in the first embodiment.

The switch device 1A includes a case 30. The case 30 has a box 30a and a lid 30b. An electromagnet 31 is immovably fixed to a bottom portion T of the box 30a. A circular shaft hole R is formed in a substantially central portion of the bottom portion T of the box 30a.

The electromagnet 31 includes a core 31a and a coil 31b. The core 31a is donut-shaped and includes a through hole H1. The coil 31b is arranged in the core 31a about the through hole H1. The core 31a has a top surface M. A circular recess 31c coaxial with the through hole H1 is formed in the top surface M. The electromagnet 31 generates a magnetic field when the coil 31b is supplied with current from the outer side of the case 30.

The lid 30b of the case 30 has a through hole Ho, though which a shaft 32 is rotatably inserted. The shaft 32 has a distal end projecting from the case 30. A knob 33 is fixed to the distal end of the shaft 32. The shaft 32 and the knob 33 form a rotary knob 34.

The shaft 32 has a basal end to which a click generation unit 35 is fixed. The click generation unit 35 may be formed integrally with the shaft 32. The click generation unit 35 is arranged in the case 30.

As shown in FIGS. 7A to 7D, the center axis of the click generation unit 35 is coaxial with the shaft 32. As shown in FIG. 6, the click generation unit 35 has a top surface MA located near the knob 33. The top surface MA abuts against a rear surface of the lid 30b of the case 30 so as to prevent the click generation unit 35 from falling out of a chamber 36 of the case 30.

Figure 7A:
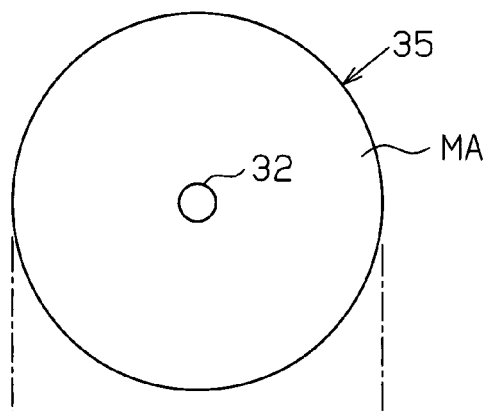
FIGS. 7A, 7B, 7C, and 7D are respectively a plan view, a side view, a bottom view, and a cross-sectional view of a click generation unit in the second embodiment.
Figure 7B:
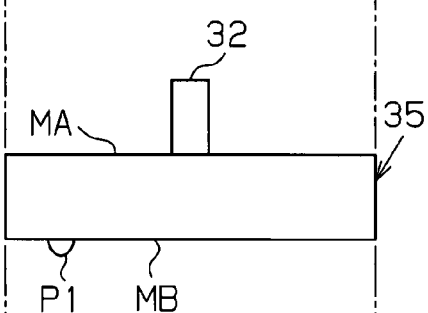
Figure 7D:
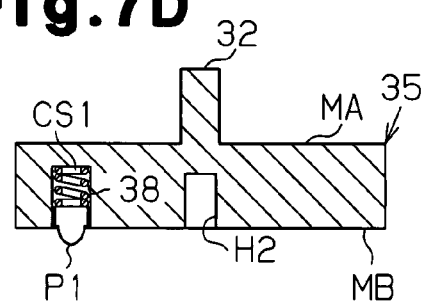
Figure 7C:
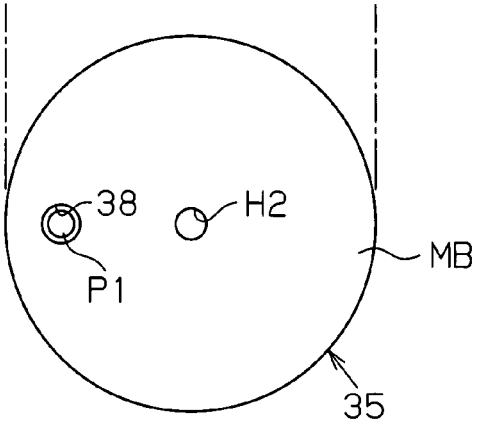

As shown in FIGS. 7C and 7D, the click generation unit 35 has a connecting hole H2 formed in a lower surface MB facing the top surface MA. The connecting hole H2 is formed to be coaxial with the shaft 32. A receptacle 38 is formed in the lower surface MB of the click generation unit 35. As shown in FIG. 7D, a first plunger P1 functioning as a projection is arranged in the receptacle 38. The first plunger P1 has a substantially semispherical distal end. A first coil spring CS1 is arranged between an inner end of the receptacle 38 and the first plunger P1. The first coil spring CS1 biases the first plunger P1 downward in FIG. 7D (that is, toward the electromagnet 31).

As shown in FIG. 6, a support 40 is arranged between the electromagnet 31 and the click generation unit 35 in the chamber 36 of the case 30.

As shown in FIGS. 8A to 8D, the support 40 includes a rotation shaft 41, a large-diameter portion 42, and a small-diameter portion 43. The large-diameter portion 42 is disk-shaped. The small-diameter portion 43 is connected to a lower surface of the large-diameter portion 42. The rotation shaft 41, the large-diameter portion 42, and the small-diameter portion 43 rotate integrally. The rotation shaft 41 is coaxial with the shaft 32. The rotation shaft 41 is rotatably received in the connecting hole H2 of the click generation unit 35, the through hole H1 of the electromagnet 31, and the shaft hole R of the box 30a. The support 40 is formed from a magnetic material.

Figure 8A:
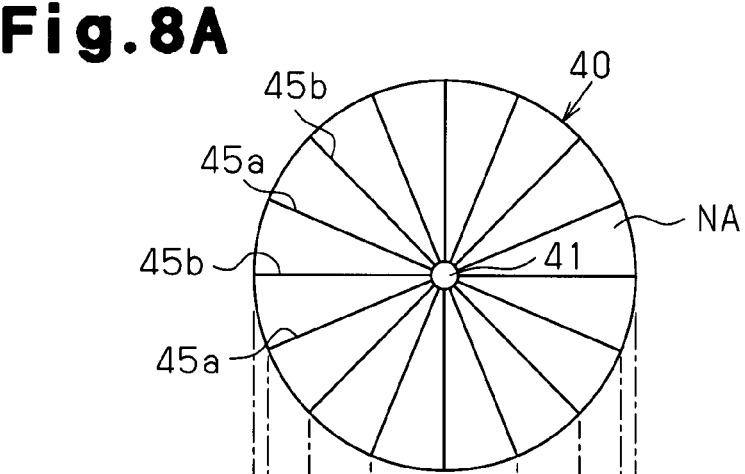
FIGS. 8A, 8B, 8C, and 8D are respectively a plan view, a side view, a bottom view, and a cross-sectional view of a support in the second embodiment.
Figure 8B:
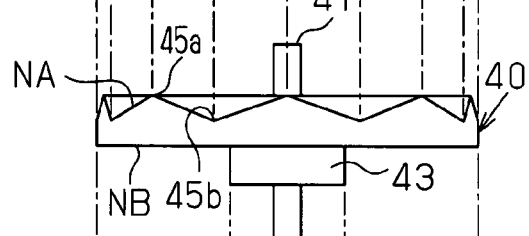
Figure 8D:
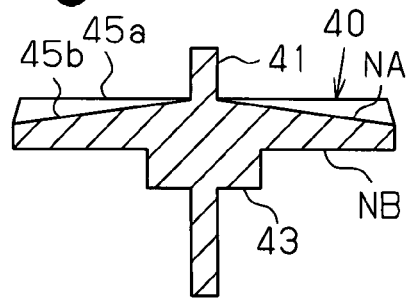
Figure 8C:
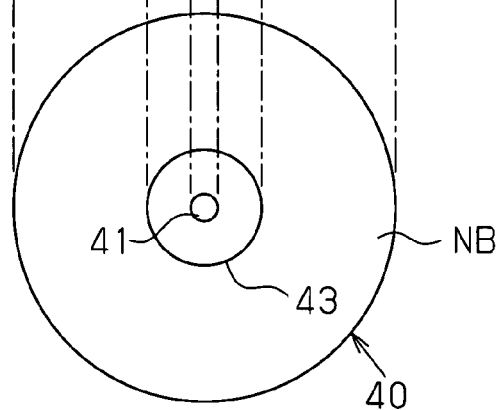

As shown in FIG. 8A, the large-diameter portion 42 has a top surface NA facing the click generation unit 35. The top surface NA includes ridges 45a and valleys 45b extending radially from the rotation shaft 41. The valleys 45b function as recesses. As shown in FIG. 6, the first plunger P1 of the click generation unit 35 is elastically or resiliently pressed against the top surface NA of the large-diameter portion 42.

The outer diameter of the small-diameter portion 43 is substantially equal to the inner diameter of the recess 31c of the electromagnet 31 (refer to FIG. 6). The small-diameter portion 43 is rotatably received in the recess 31c.

The rotation shaft 41 of the support 40 has one end spaced by a gap from the inner end of the shaft hole R of the box 30a and another end spaced by a gap from the inner end of the connecting hole H2 of the click generation unit 24. This enables movement of the support 40 in the axial direction.

When the electromagnet 31 is inactivated, the first plunger P1 is pressed against one of the valleys 45b formed in the support 40 to engage the click generation unit 35 with the support 40. Thus, when the knob 33 is rotated, the support 40 rotates in synchronization with the shaft 32 (knob 33).

When the electromagnet 31 is activated, the electromagnet 31 generates a magnetic field as shown in the state of FIG. 6. The support 40 is moved downward and attracted onto the electromagnet 31 (the upper surface M of the core 31a). This prohibits rotation of the support 40. As a result, when the knob 33 is turned to rotate the shaft 32, the click generation unit 35 is rotated but the support 40 is not rotated.

A switch detection circuit for detecting rotation of the shaft 32 is arranged in the case 30 and connected to a switch control circuit for controlling actuation of the switch device 1A as in the first embodiment. A ROM of the switch control circuit stores a magnetic field control program that is executed by a CPU. The switch detection circuit of the second embodiment generates a detection signal corresponding to the rotated amount of the shaft 32 (knob 33) in the same manner as in the first embodiment. The CPU of the switch control circuit provides a drive circuit with an on signal or an off signal in accordance with the magnetic field control program and the detection signal of the switch detection circuit. The drive circuit supplies current to the coil 31b of the electromagnet 31 in response to the on signal and suspends the supply of current to the coil 31b of the electromagnet 31 in response to the off signal.

The operation of the switch device 1A will now be described.

When an off signal is output from the CPU, the supply of current to the coil 31b of the electromagnet 31 is suspended. In this state, the support 40 is not attracted to the electromagnet 31. Thus, when turning the knob 33 to rotate the shaft 32, the support 40 rotates together with the shaft 32 (knob 33). The first plunger P1 does not move over the ridge 45a of the click generation unit 35. Accordingly, the shaft 32 (knob 33) is operated without producing clicks.

After outputting the off signal, the CPU outputs an on signal in accordance with the magnetic field control program stored in the ROM of the switch control circuit. In response to the on signal, current is supplied to the coil 31b of the electromagnet 31. As a result, the support 40 is attracted onto the electromagnet 31. This prohibits rotation of the support 40. When turning the knob 33 to rotate the shaft 32, the click generation unit 35 rotates but the support 40 does not rotate.

The first plunger P1 moves over the ridges 45a formed on the upper surface NA of the support 40 as the click generation unit 35 rotates. Thus, the operation of the shaft 32 (knob 33) produces clicks. As described above, the tactile sensation of the shaft 32 (knob 33) is controlled by activating and inactivating the electromagnet 31.

The second embodiment has the advantages described below.

(1) The first plunger P1 is arranged in the click generation unit 35. Further, the ridges 45a and the valleys 45b are alternately on the support 40 at locations where the first plunger P1 abuts against the lower surface of the click generation unit 35.

When the electromagnet 31 is activated, the support 40 is attracted onto the electromagnet 31. In this manner, the support 40 is connected to and separated from the click generation unit 35. This enables the shaft 32 (knob 33) to produce clicks as the first plunger P1 moves over the ridges 45a formed on the support 40.

Further, when the electromagnet 31 is inactivated, the click generation unit 35 is rotated integrally with the support 40 by the first plunger P1. In this case, the shaft 32 (knob 33) does not produce clicks.

A switch device 1B according to a third embodiment of the present invention will now be described with reference to FIGS. 9 to 11. The switch device 1B is a rotary switch for actuating a car navigation system as in the second embodiment. The switch device 1B is identical to the switch device 1A of the second embodiment except for the structures of a support 40 and an electromagnet 31. The switch device 1B will be described focusing on the structures of the support and the electromagnet unique to the third embodiment.

Figure 9:
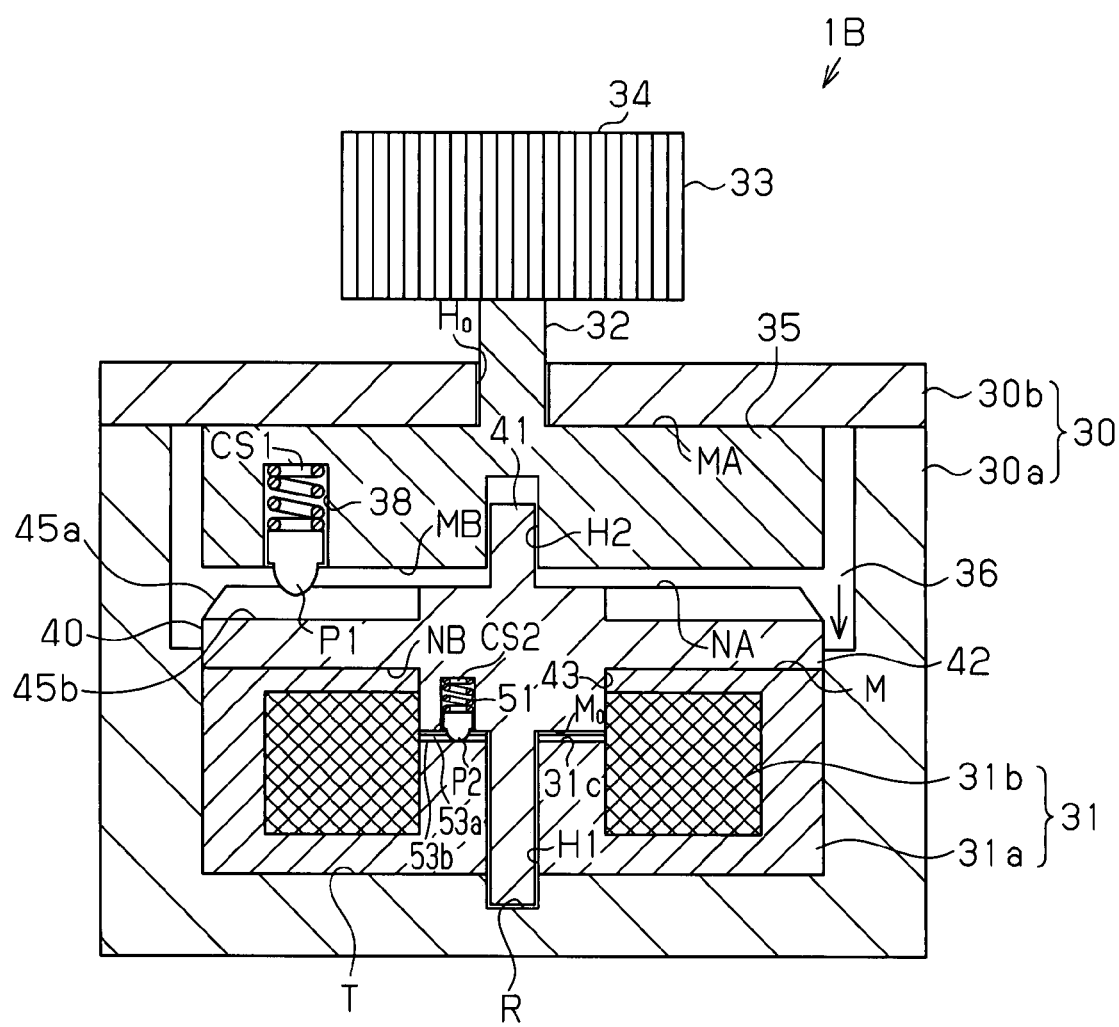
FIG. 9 is a cross-sectional view of a switch device according to a third embodiment of the present invention.

As shown in FIG. 9, the support 40 of the switch device 1B has a second plunger P2, which functions as a projection, arranged in a lower surface Mo of a small-diameter portion 43.

As shown in FIGS. 10A to 10D, a receptacle 51 is formed in the lower surface Mo of the small-diameter portion 43. As shown in FIG. 10D, the second plunger P2 is arranged in the receptacle 51. The second plunger P2 has a semispherical distal end. A second coil spring CS2 is arranged between an inner end of the receptacle 51 and the second plunger P2. The second coil spring CS2 biases the second plunger P2 downward in FIG. 10D (i.e., toward the electromagnet 31).

The spring constant of the second coil spring CS2 is smaller than the spring constant of a first spring coil CS1. Thus, the load required to move the second plunger P2 is smaller than the load required to move a first plunger P1.

Figure 11:
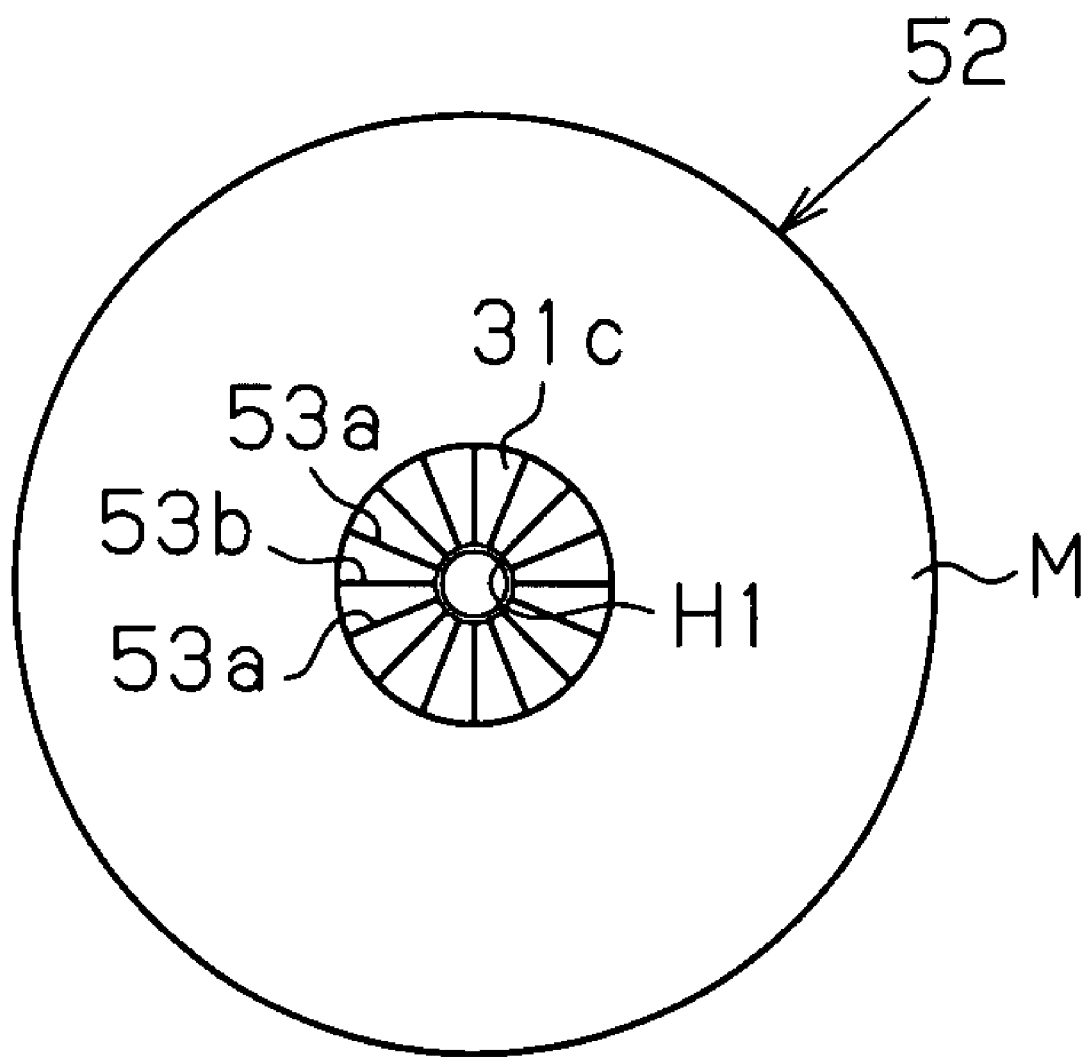
FIG. 11 is a diagram showing the structure of an electromagnet in the third embodiment.

As shown in FIGS. 9 and 11, ridges 53a and valleys 53b are formed in a surface of a recess 31c of the electromagnet 31. The valleys 53b function as recesses. The ridges 53a and the valleys 53b extend radially from a through hole H1. The second plunger P2 (refer to FIG. 10) is elastically pressed against the ridges 53a and the valleys 53b.

When current is not supplied to a coil 31b of the electromagnet 31 and the electromagnet 31 is inactivated, the first plunger P1 of a click generation unit 35 abuts against a ridge 45a and a valley 45b formed on the support 40, and the second plunger P2 of the support 40 abuts against a ridge 53a and a valley 53b formed on the electromagnet 31.

When turning a knob 33 to rotate a shaft 32, the first plunger P1 does not move over the ridge 45a of the support 40, but the second plunger P2 moves over a ridge 53a of the electromagnet 31 against the biasing force of the second coil spring CS2, which has a relatively small spring constant. The first plunger P1 keeps the support 40 engaged with the click generation unit 35. Thus, the support 40 rotates integrally with the shaft 32 (knob 33). Further, the second plunger P2 moves over the ridges 53a of the electromagnet 31. Thus, the operation of the shaft 32 (knob 33) produces clicks with the second plunger P2 and the ridges 53a and valleys 53b formed on the electromagnet 31.

When current is supplied to the coil 31b of the electromagnet 31 and the electromagnet 31 is activated, the electromagnet 31 generates a magnetic field attracting the support 40. Thus, the support 40 is moved downward and attracted onto the electromagnet 31 as shown in the state of FIG. 9. This causes the support 40 to be immovable and prohibits rotation of the support 40. When turning the knob 33 to rotate the shaft 32, the click generation unit 35 rotates but the support 40 does not rotate. The operation of the shaft 32 (knob 33) produces clicks with the first plunger P1 and the ridge 45a and the valley 45b formed on the support 40.

In this manner, the tactile sensation of the shaft 32 (knob 33) is adjusted or changed between two different states by activating and inactivating the electromagnet 31.

The third embodiment has the advantages described below.

(1) The first plunger P1 is arranged on the click generation unit 35. The support 40 having the ridges 45a and the valleys 45b are arranged under the click generation unit 35. The second plunger P2 is arranged on the small-diameter portion 43 of the support 40. The ridges 53a and the valleys 53b are formed in the recess 31c of the electromagnet 31 facing the second plunger P2.

The shaft 32 (knob 33) produces clicks as the first plunger P1 moves over the ridges 45a formed on the support 40 when the electromagnet 31 is activated. The shaft 32 (knob 33) also produces clicks as the second plunger P2 moves over the ridges 53a formed on the electromagnet 31 when the electromagnet 31 is inactivated.

A switch device 1C according to a fourth embodiment of the present invention will now be described with reference to FIG. 12. The switch device 1C is a rotary switch for actuating a car navigation system as in the above-described embodiments of the present invention. The switch device 1C is identical to the switch device 1B of the third embodiment except in that a plunger is arranged on an electromagnet 31 and ridges and valleys that come in contact with the plunger are formed on a small-diameter portion 43 of a support 40. The switch device 1C will be described focusing on the structures of the electromagnet 31 and the support 40.

Figure 12:
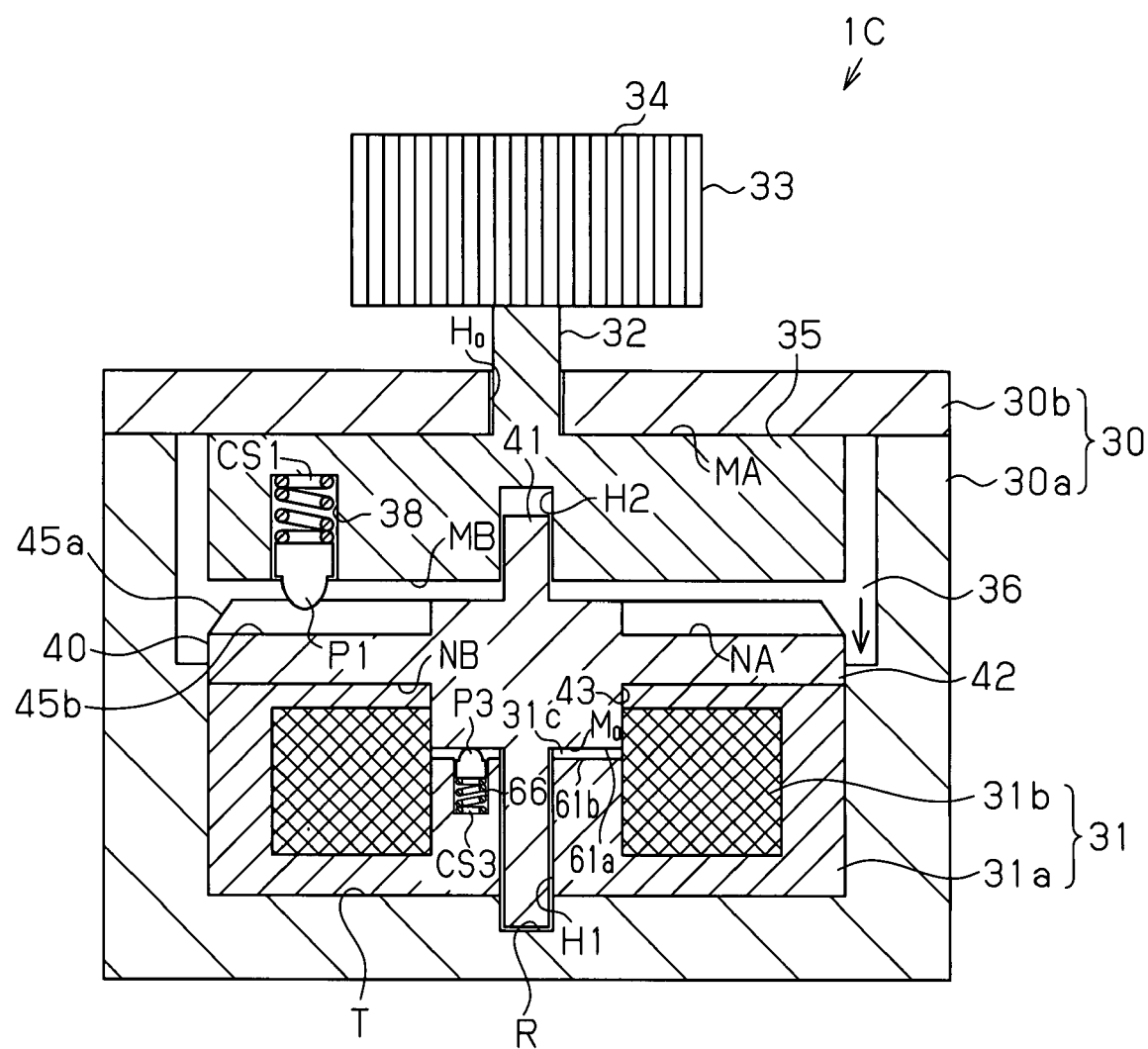
FIG. 12 is a cross-sectional view of a switch device according to a fourth embodiment of the present invention.

As shown in FIG. 12, ridges 61a and valleys 61b are formed on a lower surface Mo of the small-diameter portion 43 of the support 40. The valleys 61b function as recesses. The ridges 61a and the valleys 61b extend radially from a rotation shaft 41.

A receptacle 66 is formed in the surface of a recess 31c in the electromagnet 31. A third plunger P3 functioning as a projection is arranged in the receptacle 66. The third plunger P3 has a semispherical distal end. A third coil spring CS3 is arranged between an inner end of the receptacle 66 and the third plunger P3. The third coil spring CS3 biases the third plunger P3 toward the ridges 61a and the valleys 61b formed on the small-diameter portion 43 of the support 40.

The spring constant of the third coil spring CS3 is smaller than the spring constant of a first coil spring CS1.

In the switch device 1C, in a state in which current is not supplied to a coil 31b of the electromagnet 31 and the electromagnet 31 is inactivated, by turning a knob 33 and rotating a shaft 32, the first plunger P1 abuts against a ridge 45a and valley 45b formed in the recess 31c of a core 31a and the third plunger P3 abuts against a ridge 61a and a valley 61b.

The first plunger P1 does not move over the ridge 45a, but the third plunger P3 moves over a ridge 61a against the biasing force of the third coil spring CS3, which has a relatively small spring constant.

The third plunger P3 moves over the ridges 61a. Thus, the operation of the shaft 32 (knob 33) produces clicks with the third plunger P3 and the ridges 61a and valleys 61b.

When current is supplied to the coil 31b of the electromagnet 31 and the electromagnet 31 is activated, the electromagnet 31 generates a magnetic field attracting the support 40. The support 40 is moved downward and attracted onto the electromagnet 31 as shown in the state of FIG. 12. This causes the support 40 to be immovable and prohibits rotation of the support 40. As a result, when turning the knob 33 to rotate the shaft 32, the click generation unit 35 rotates but the support 40 does not rotate. Thus, the operation of the shaft 32 (knob 33) produces clicks with the first plunger P1 and the ridges 45a and valleys 45b formed on the support 40.

In this manner, the electromagnet 31 is activated and inactivated to adjust the tactile sensation of the shaft 32 (knob 33) between two different states.

The fourth embodiment has the advantages described below.

(1) The first plunger P1 is arranged on the click generation unit 35, and the ridges 45a and the valleys 45b that come in contact with the first plunger P1 are formed on the upper surface NA of the support 40. Further, the ridges 61a and the valleys 61a are formed on the lower surface Mo of the small-diameter portion 43 of the support 40. Additionally, the third plunger P3 is arranged in the recess 31c of the electromagnet 31 at a location where the third plunger P3 elastically presses the ridges 61a and the valleys 61b. Thus, the shaft 32 (knob 33) produces clicks with the third plunger P3 that moves over the ridges 61a formed on the support 40 when the electromagnet 31 is inactivated. The shaft 32 (knob 33) produces clicks with the first plunger P1 that moves over the ridge 45a formed on the support 40 when the electromagnet 31 is activated.

A switch device 1D according to a fifth embodiment of the present invention will now be described with reference to FIGS. 13 and 14. The switch device 1D of the fifth embodiment is a rotary switch for actuating a car navigation system as in the above-described embodiments of the present invention. The switch device 1D is identical to the switch device 1B of the second embodiment except for the structures of a case 30 and a support 40. The switch device 1D will be described focusing on the structures of the case 30 and the support 40.

Figure 13:
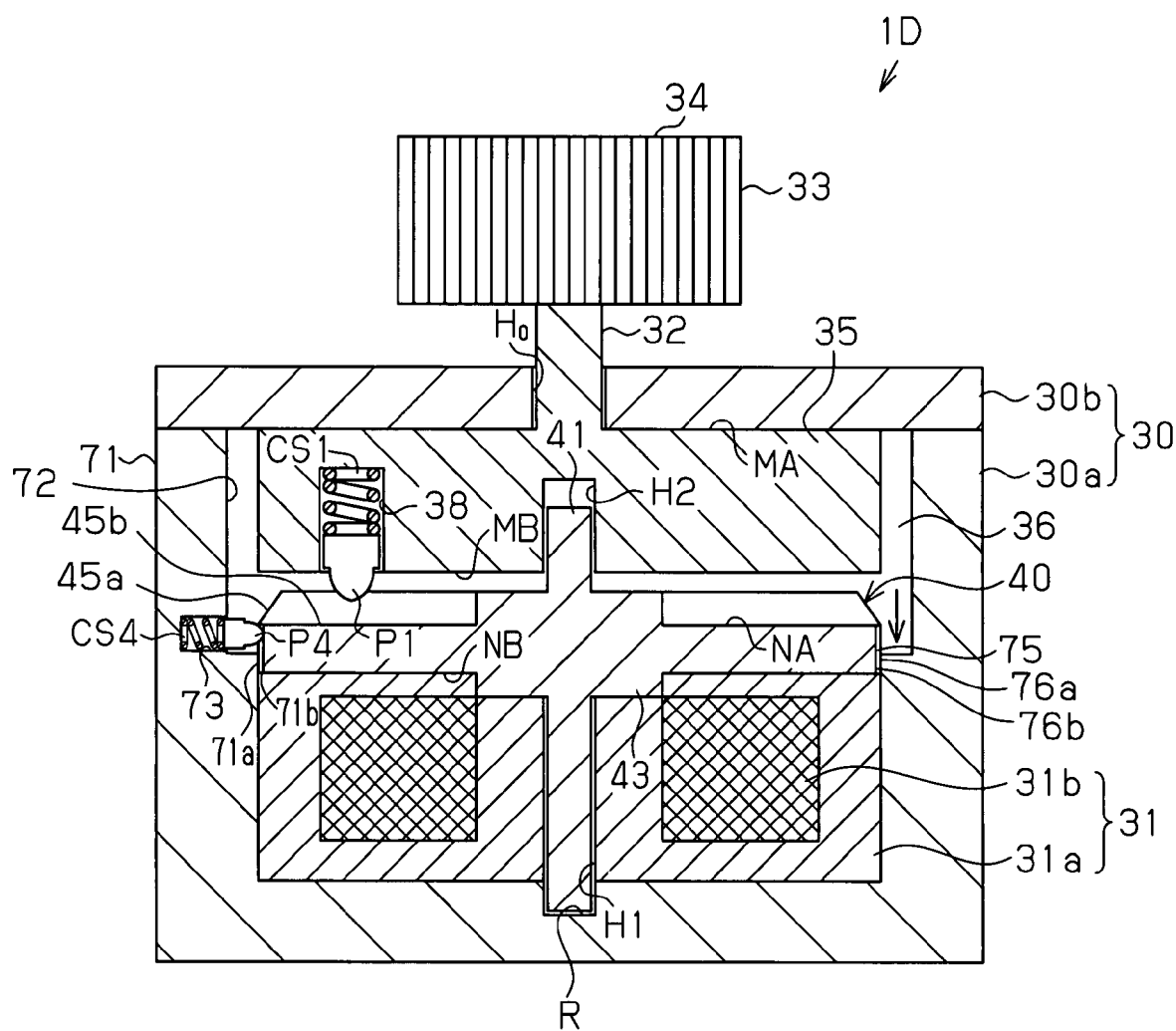
FIG. 13 is a cross-sectional view of a switch device according to a fifth embodiment of the present invention.

As shown in FIG. 13, a receptacle 73 is formed on an inner surface 72 of a side wall 71 (left wall in FIG. 13) of a box 30a of the case 30 in the fifth embodiment. A fourth plunger P4 functioning as a projection is arranged in the receptacle 73. The fourth plunger P4 has a semispherical distal end. A fourth coil spring CS4 is arranged between the inner end of the receptacle 73 and the fourth plunger P4. The fourth coil spring CS4 biases the fourth plunger P4 into a chamber 36 of the case 30 (to the right in FIG. 13).

The spring constant of the fourth coil spring CS4 is smaller than the spring constant of a first coil spring CS1. Thus, the load required to move the fourth plunger P4 is smaller than the load required to move a first plunger P1.

Figure 14A:
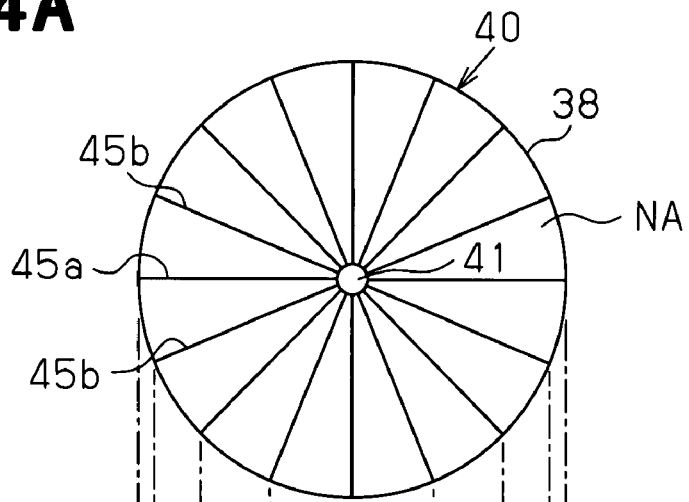
FIGS. 14A, 14B, and 14C are respectively a plan view, a side view, and a bottom view of a click generation unit in the fifth embodiment.
Figure 14B:
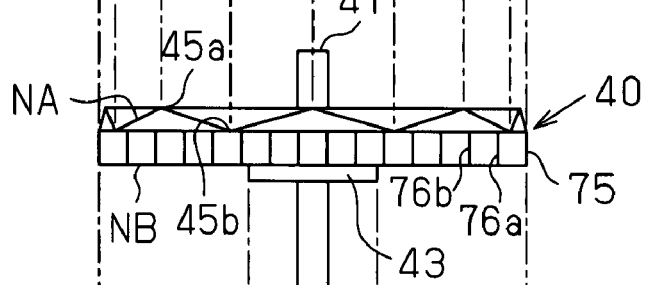
Figure 14C:
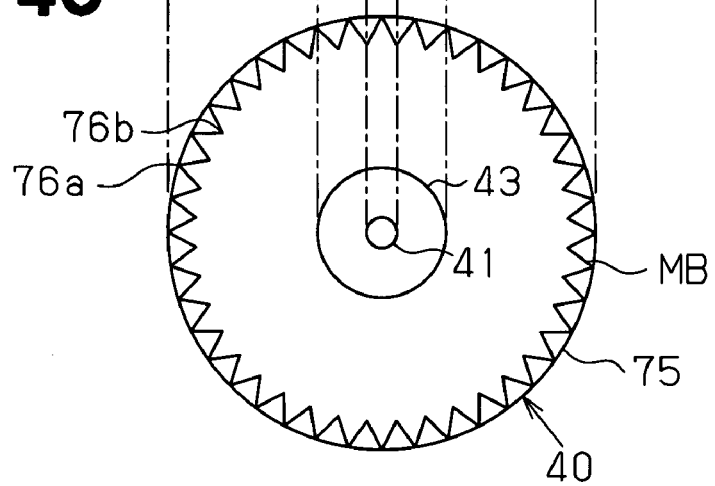

FIGS. 14A and 14B show a support 40 of the switch device 1D of the fifth embodiment. Ridges 76a and valleys 76b are formed alternately on an outer circumferential surface 75 of the support 40 in the circumferential direction. The valleys 76b function as recesses. The support 40 has ridges 45a and valleys 45b that extend radially on its top surface NA in the same manner as in the second embodiment. The receptacle 73 of the box 30a faces the outer circumferential surface 75 of the support 40. Thus, the fourth plunger P4 elastically presses the ridges 76a and the valleys 76b formed on the outer circumferential surface 75 of the support 40.

In the switch device 1D, the first plunger P1 abuts against a ridge 45a and a valley 45b, and the fourth plunger P4 abuts against a ridge 76a and a valley 76b.

When turning a knob 33 to rotate the shaft 32, the first plunger P1 does not move over the ridges 45a. However, the fourth plunger P4 moves over the ridges 76a against the biasing force of the fourth coil spring CS4, which has a relatively small spring constant.

Thus, when the shaft 32 is rotated while a coil 31b of the electromagnet 31 is not supplied with a current and the electromagnet 31 is inactivated, the operation of the shaft 32 (knob 33) produces clicks with the fourth plunger P4 and the ridge 76a and the valley 76b.

When current is supplied to the coil 31b of the electromagnet 31 and the electromagnet 31 is activated, the electromagnet 31 generates a magnetic force that attracts the support 40. This causes the support 40 to be immovable and prohibits rotation of the support 40. As a result, when turning the knob 33 to rotate the shaft 32, a click generation unit 35 is rotated. However, the support 40 does not rotate. In this case, the operation of the shaft 32 (knob 33) produces clicks with the first plunger P1 and the ridges 45a and the valleys 45b formed on the support 40.

In this manner, the electromagnet 31 is activated and inactivated to adjust the tactile sensation of the shaft 32 (knob 33) between two different states.

The fifth embodiment has the advantages described below.

(1) The first plunger P1 is arranged on the click generation unit 35 and the support 40. The ridges 40a and the valleys 40b are arranged alternately at locations when the support 40 comes in contact with the first plunger P1. Further, the ridges 76a and the valleys 76b are arranged on the outer circumferential surface 75 of the support 40. Additionally, the fourth plunger P4 is arranged in the inner surface 72 of the case 30 facing the outer circumferential surface 75 of the support 40. The shaft 32 (knob 33) produces clicks as the first plunger P1 moves over the ridges 45a formed on the click generation unit 35 when the electromagnet 31 is activated. The shaft 32 (knob 33) is produces clicks as the fourth plunger P4 moves over the ridges 76a formed on the outer circumferential surface 75 of the support 40 when the electromagnet 31 is inactivated.

A switch device 1E according to a sixth embodiment of the present invention will now be described with reference to FIGS. 15 and 16. The switch device 1E of the sixth embodiment is a rotary switch for actuating a car navigation system as in the above-described embodiments of the present invention.

Figure 15:
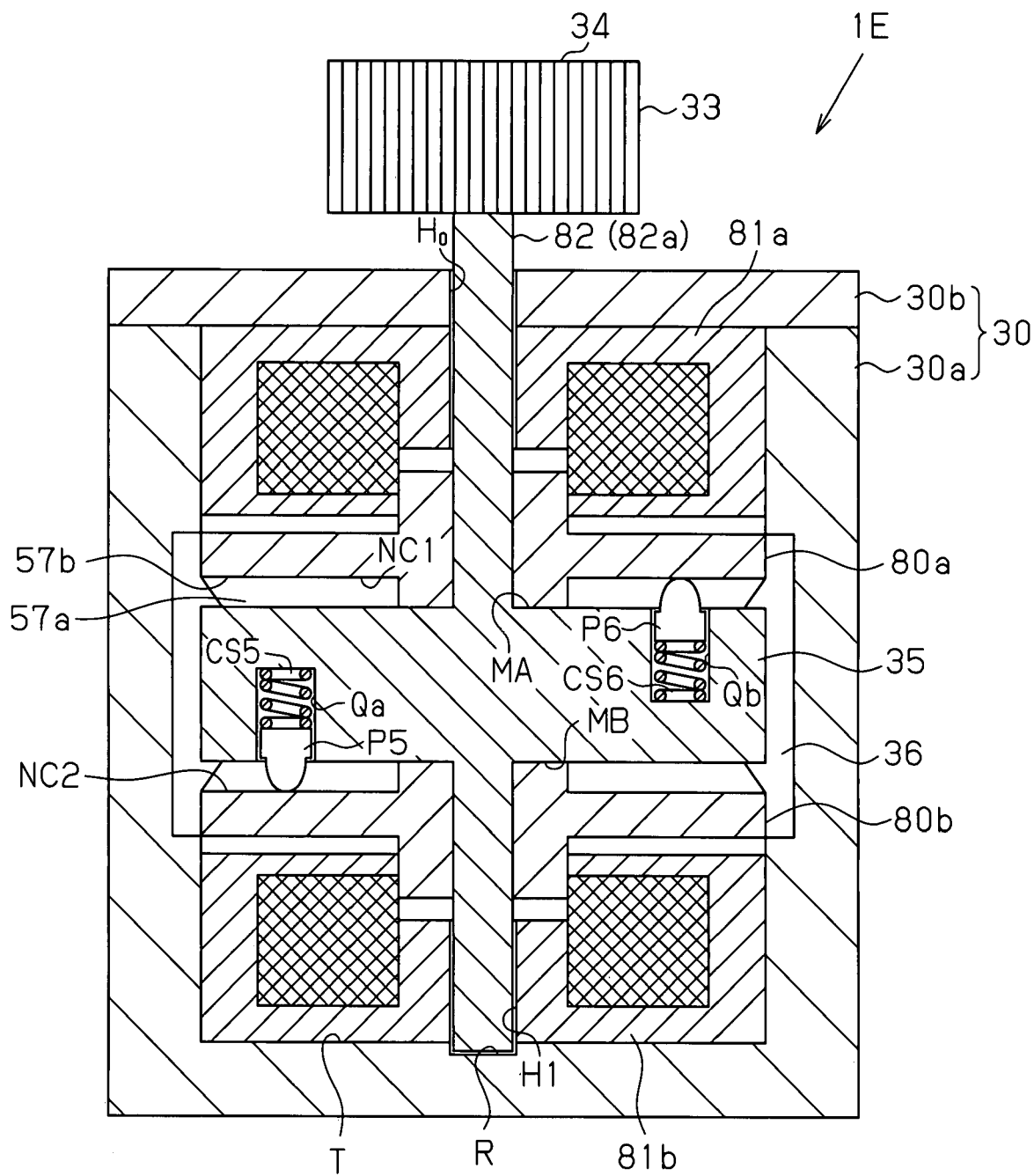
FIG. 15 is a cross-sectional view of a switch device according to a sixth embodiment of the present invention.

As shown in FIG. 15, the switch device 1E of the sixth embodiment includes a case 30, a rotary knob 34, a click generation unit 35, first and second supports 80a and 80b, and first and second electromagnets 81a and 81b.

The rotary knob 34 has a shaft 82. The shaft 82 is rotatably supported in a shaft hole R formed in a central portion of a bottom portion T of a box 30a and a through hole Ho formed in a lid 30b. The shaft 82 is immovable in the axis direction. The shaft 82 projects outward from the through hole Ho. A knob 33 is fixed to a distal end of the shaft 82.

A click generation unit 35 is formed at a substantially middle position of the shaft 82. The click generation unit 35 is formed integrally with the shaft 82. To facilitate description, the portion of the shaft 82 extending upward from the click generation unit 35 is referred to as an upper shaft portion 82a and the portion of the shaft 82 extending downward from the click generation unit 35 is referred to as a lower shaft portion 82b.

The first support 80a and first electromagnet 81a are arranged on the circumference of the upper shaft portion 82a. The first support 80a is located upward from the click generation unit 35. The first electromagnet 81a is located upward from the first support 80a. The second support 80b and second electromagnet 81b are arranged on the circumference of the lower shaft portion 82b. The second support 80b is located downward from the click generation unit 35. The second electromagnet 81b is located downward from the second support 80b.

The first and second supports 80a and 80b have the same structure as the support 40 of the second embodiment. The first and second supports 80a and 80b are supported on the upper and lower shaft portions 82a and 82b in a manner that they are rotatable and axially movable. A lower surface NC1 of the first support 80a and an upper surface NC2 of the second support 80b face the click generation unit 35.

Ridges 57a and valleys 57b are formed on the lower surface NC1 of the first support 80a. The valleys 57b function as recesses. Ridges 58a and valleys 58b are formed on the upper surface NC2 of the second support 80b. The valleys 58b function as recesses. The pitch of the ridges 57a (pitch of the valleys 57b) of the first support 80a is smaller than the pitch of the ridges 58a (pitch of the valleys 58b) of the second support 80b.

The first and second electromagnets 81a and 81b each have the same structure in the sixth embodiment. Further, the structure of the first and second electromagnet 81a and 81b is the same as in the second embodiment. The first electromagnet 81a attracts the first support 80a when activated. The second electromagnet 81b attracts the second support 80b when activated.

As shown in FIGS. 16A to 16D, the click generation unit 35 of the sixth embodiment is coaxial with the shaft 82. As shown in FIG. 16C, the click generation unit 35 has a lower surface MB facing the second support 80b. A first receptacle Qa is formed in the lower surface MB. As shown in FIG. 16A, the click generation unit 35 has an upper surface MA facing the first support 80a. A second receptacle Qb is formed in the upper surface MA.

As shown in FIG. 16D, a fifth plunger P5 functioning as a projection is arranged in the first receptacle Qa. The fifth plunger P5 has a semispherical distal end. A fifth coil spring CS5 is arranged between the inner end of the first receptacle Qa and the fifth plunger P5. The fifth coil spring CS5 biases the fifth plunger P5 toward the upper surface NC2 of the second support 80b.

A sixth plunger P6 functioning as a projection is arranged in the second receptacle Qb. The sixth plunger P6 has a substantially semispherical distal end. A sixth coil spring CS6 is arranged between an inner end of the second receptacle Qb and the sixth plunger P6. The sixth coil spring CS6 biases the sixth plunger P6 toward the lower surface NC1 of the first support 80a.

The first support 80a is movable by a predetermined amount along the shaft 82 between the click generation unit 35 and the first electromagnet 81a. The second support 80b is movable by a predetermined amount along the shaft 82 between the click generation unit 35 and the second electromagnet 81b.

The operation of the switch device 1E will now be described.

A case in which the first electromagnet 81a is activated and the second electromagnet 81b is inactivated will first be described.

In this case, the first support 80a is attracted onto the first electromagnet 81a. This prohibits rotation of the first support 80a. The second support 80b is not attracted to the second electromagnet 81b and is rotatable. The fifth plunger P5 engages the second support 80b and the click generation unit 35.

When the rotary knob 34 is rotated in this state, the sixth plunger P6 moves over the ridges 57a formed on the first support 80a. The operation of the rotary knob 34 produces clicks with the sixth plunger P6 at a frequency that is in accordance with the pitch of the ridges 57a and the valleys 57b formed on the first support 80a.

A case in which the first electromagnet 81a is inactivated and the second electromagnet 81b is activated will now be described.

In this case, the first support 80a is not attracted to the first electromagnet 81a and is rotatable. The sixth plunger P6 engages the first support 80a and the click generation unit 35. The second support 80b is attracted onto the second electromagnet 81b. This prohibits rotation of the second support 80b.

When the rotary knob 34 is rotated in this state, the fifth plunger P5 moves over the ridges 58a formed on the second support 80b. The operation of the rotary knob 34 produces clicks with the fifth plunger P5 at a frequency that is in accordance with the pitch of the ridges 58a and the valleys 58b formed on the second support 80b. The pitch of the ridges 57a and the valleys 57b of the first support 80a is smaller than the pitch of the ridges 58a and the valleys 58b of the second support 80b. Thus, the interval at which the clicks are produced is longer in this case as compared with when the first electromagnet 81a is inactivated and the second electromagnet 81b is activated.

A case in which the first electromagnet 81a and the second electromagnet 81b are both inactivated will now be described.

The first and second supports 80a and 80b are not attracted to the corresponding electromagnets 81a and 81b and are rotatable. The sixth plunger P6 engages the first support 80a and the click generation unit 35. The fifth plunger P5 engages the second support 80b and the click generation unit 35.

When the rotary knob 34 is rotated in this state, the first and second supports 80a and 80b both rotate integrally with the rotary knob 34. The rotary knob 34 is operated without producing clicks.

A case in which the first electromagnet 81a and the second electromagnet 81b are both activated will now be described.

In this case, the first support 80a is attracted onto the first electromagnet 81a and the second support 80b is attracted onto the second electromagnet 81b. This prohibits rotation of the first and second supports 80a and 80b.

When the rotary knob 34 is rotated in this state, the sixth plunger P6 moves over the ridges 57a formed on the first support 80a, and the fifth plunger P5 moves over the ridges 58a formed on the second support 80b. Thus, the operation of the rotary knob 52 produces clicks at a frequency that is in accordance with the pitch of the ridges 57a and 58b and the valleys 57b and 58b formed on the first and second supports 80a and 80b.

The sixth embodiment has the advantages described below.

(1) The fifth plunger P5 is arranged on the upper surface MA of the click generation unit 35, and the sixth plunger P6 is arranged on the lower surface MB of the click generation unit 35. The ridges 57a and the valleys 57b are arranged on the lower surface NC1 of the first support 80a facing the plunger P8. The ridges 58a and the valleys 58b are arranged on the upper surface NC2 of the second support 80b facing the plunger P6. The first support 80a is arranged between the click generation unit 35 and the first electromagnet 81a. The second support 80b is arranged between the click generation unit 35 and the second electromagnet 81b.

By activating the first electromagnet 81a and inactivating the second electromagnet 81b, the operation of the rotary knob 34 produces clicks as the sixth plunger P6 moves over the ridges 57a formed on the first support 80a.

By inactivating the first electromagnet 81a and activating the second electromagnet 81b, the operation of the rotary knob 34 produces clicks as the fifth plunger P5 moves over the ridge 58a formed on the second support 80b. When the first and second electromagnets 81a and 81b are both inactivated, the rotary knob 34 is operated without producing clicks.

When the first and second electromagnets 81a and 81b are both activated, the operation of the rotary knob 34 produces clicks as the fifth plunger P5 moves over the ridge 58a formed on the second support 80b and as the sixth plunger P6 moves over the ridge 57a formed on the first support 80a.

As described above, the structure of the sixth embodiment adjusts the tactile sensation between different states by simply activating and inactivating the first and second electromagnets 81a and 81b.

A switch device 1F according to a seventh embodiment of the present invention will now be described with reference to FIG. 17. The switch device 1F of the seventh embodiment is a rotary switch for actuating a car navigation system as in the above-described embodiments of the present invention.

Figure 17:
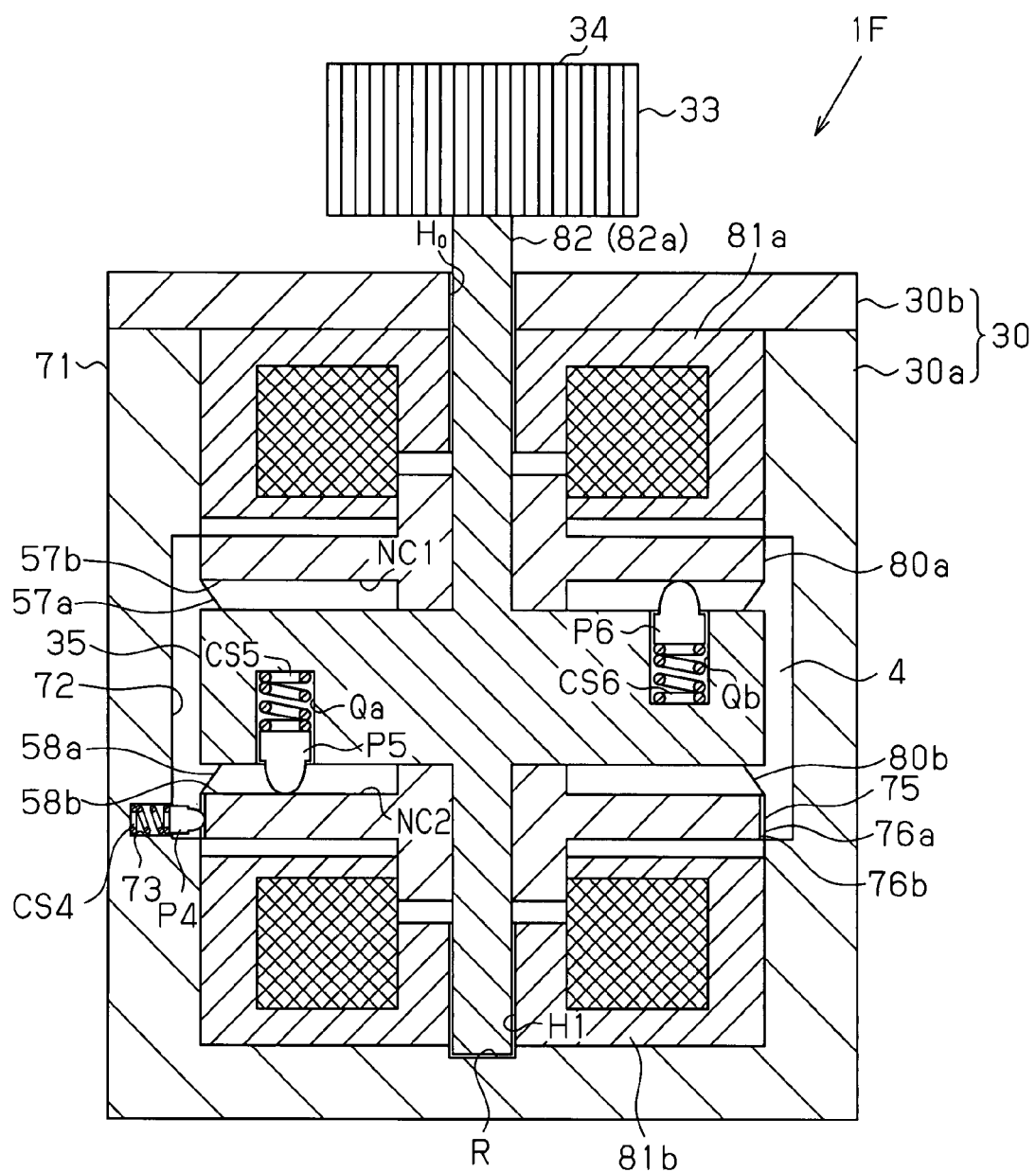
FIG. 17 is a cross-sectional view of a switch device according to a seventh embodiment of the present invention.

As shown in FIG. 17, a case 30 of the switch device 1F of the seventh embodiment has a receptacle 73 formed in a side wall 71 in the same manner as in the fifth embodiment. A fourth coil spring CS4 and a fourth plunger P4 are arranged in the receptacle 73.

A rotary knob 34 includes a click generation unit 35 formed at a substantially middle position of the shaft 82 in the same manner as in the sixth embodiment. The rotary knob 34 is formed integrally with the shaft 82. A first support 80a and a first electromagnet 81a are arranged on the circumference of an upper shaft portion 82a. A second support 80b and a second electromagnet 81b are arranged on the circumference of a lower shaft portion 82b.

Ridges 76a and valleys 76b are alternately arranged on an outer circumferential surface 75 of the second support 80b in the circumferential direction in the same manner as in the support 40 of the fifth embodiment. The fourth plunger P4 elastically presses the ridges 76a and the valleys 76b.

The spring constant of the fourth coil spring CS4 is smaller than the spring constant of a fifth coil spring CS5 arranged on the click generation unit 35. The load required to move the fourth plunger P4 is smaller than the load required to move a fifth plunger P5.

The other components of the switch device 1F in the seventh embodiment are the same as those in the sixth embodiment. Thus, the same components are given the same reference numerals and will not be described in detail.

The operation of the switch device 1F will now be described.

A case in which the first electromagnet 81a is activated and the second electromagnet 81b is inactivated will first be described.

In this case, the first support 80a is attracted onto the first electromagnet 81a. This prohibits rotation of the first support 80a. The second support 80b is not attracted to the second electromagnet 81b and is rotatable. The spring constant of the fourth coil spring CS4 in the present embodiment is smaller than the spring constant of the fifth coil spring CS5 as described above. Thus, the fifth plunger P5 engages the second support 80b and the click generation unit 35.

When the rotary knob 34 is rotated, the sixth plunger P6 moves over the ridges 57a formed on the first support 80a against the biasing force of the sixth coil spring CS6, which has a smaller spring constant than the fifth coil spring CS5. The fourth plunger P4 moves over the ridges 76a arranged on the outer circumferential surface 75 of the second support 80b against the biasing force of the fourth coil spring CS4, which has a smaller spring constant than the coil springs CS5 and CS6. As a result, the rotary knob 34 produces clicks at a frequency that is in accordance with the pitch of the ridges 57a and 76a and the valleys 57b and 76b formed on the first and second supports 80a and 80b.

A case in which the first electromagnet 81a is inactivated and the second electromagnet 81b is activated will now be described.

The first support 80a is not attracted to the first electromagnet 81a and is rotatable. The sixth plunger P6 engages the first support 80a and the click generation unit 35. The second support 80b is attracted onto the second electromagnet 81b. This prohibits rotation of the second support 80b.

When the rotary knob 34 is rotated in this state, the fifth plunger P5 moves over the ridges 58a formed on the second support 80b. The operation of the rotary knob 34 produces clicks at a frequency that is in accordance with the pitch of the ridges 58a and the valleys 58b formed on the second support 80b.

A case in which the first electromagnet 81a and the second electromagnet 81b are both inactivated will now be described.

As shown in FIG. 17, the first and second supports 80a and 80b are not attracted to the electromagnets 81a and 81b and are rotatable. The sixth plunger P6 engages the first support 80a and the click generation unit 35. The fifth plunger P5 engages the second support 80b and the click generation unit 35.

When the rotary knob 34 is rotated in this state, the first and second supports 80a and 80b both rotate integrally with the rotary knob 34. The fourth plunger P4 moves over the ridges 76a formed on the second support 80b. As a result, the operation of the rotary knob 34 produces clicks at a frequency that is in accordance with the pitch of the ridges 76a formed on the outer circumferential surface 75 of the second support 80b.

A case in which the first electromagnet 81a and the second electromagnet 81b are both activated will now be described.

The first support 80a is attracted onto the first electromagnet 81a, and the second support 80b is attracted onto the second electromagnet 81b. This prohibits rotation of the first and second supports 80a and 80b.

When the rotary knob 34 is rotated in this state, the sixth plunger P6 moves over the ridges 57a formed on the first support 80a, and the fifth plunger P5 moves over the ridges 58a formed on the second support 80b. Thus, the operation of the rotary knob 34 produces clicks with a frequency that is in accordance with the pitch of the ridges 57a and 58b and the valleys 57a and 58b formed on the first and second supports 80a and 80b.

The seventh embodiment has the advantages described below.

(1) The fifth plunger P5 is arranged in the upper surface MA of the click generation unit 35, and the sixth plunger P6 is arranged in the lower surface MB of the click generation unit 35. The ridges 57a and the valleys 57b are arranged on the lower surface NC1 of the first support 80a facing the plunger P6. The ridges 58a and the valleys 58b are arranged on the upper surface NC2 of the second support 80b facing the plunger P5. The first support 80a is arranged between the click generation unit 35 and the first electromagnet 81a. The second support 80b is arranged between the click generation unit 35 and the second electromagnet 81b. The fourth plunger P4 is arranged in the side wall 71 of the case 30 facing the outer circumferential surface 75 of the second support 80b.

Accordingly, by activating the first electromagnet 81a and inactivating the second electromagnet 81b, the operation of the rotary knob 34 produces clicks as the sixth plunger P6 moves over the ridges 57a formed on the first support 80a and produces clicks as the fourth plunger P4 moves over the ridges 76a formed on the outer circumferential surface 75 of the second support 80b.

By inactivating the first electromagnet 81a and activating the second electromagnet 81b, the operation of the rotary knob 34 produces clicks as the fifth plunger P5 moves over the ridge 58a formed on the second support 80b.

When the first and second electromagnets 81a and 81b are both inactivated, the operation of the rotary knob 34 produces clicks as the fourth plunger P4 moves over the ridges 76a formed on the outer circumferential surface 75 of the second support 80b.

When the first and second electromagnets 81a and 81b are both activated, the operation of the rotary knob 34 produces clicks as the fifth plunger P5 moves over the ridges 58a formed on the second support 80b and as the sixth plunger P6 moves over the ridge 57a formed on the first support 80a.

As described above, the structure of the seventh embodiment enables the tactile sensation to be adjusted or changed between different states by simply activating and inactivating the first and second electromagnets 81a and 81b.

A switch device 1G according to an eighth embodiment of the present invention will now be described with reference to FIGS. 18 to 21. The switch device 1G of the eighth embodiment is a rotary switch for actuating a car navigation system as in the above-described embodiments of the present invention.

Figure 18:
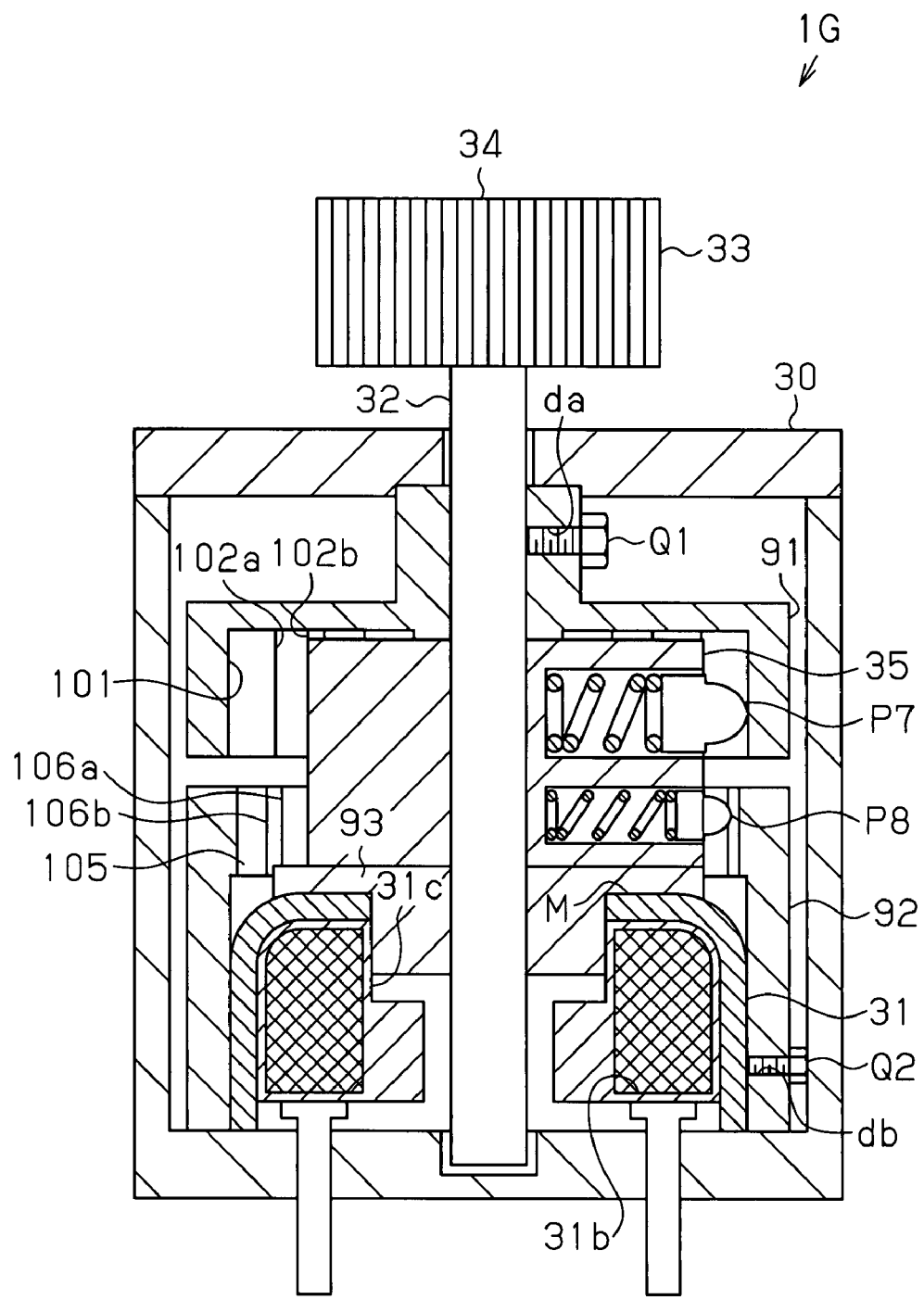
FIG. 18 is a cross-sectional view of a switch device according to an eighth embodiment of the present invention.

As shown in FIG. 18, the switch device 1G of the eighth embodiment includes a shaft 32 that is rotatably inserted into a case 30. The shaft 32 is inserted through a click generation unit 35. A first support 91 is fixed to the shaft 32. The first support 91 is located upward from the click generation unit 35. A second support 92 is fixed to an electromagnet 31 under the click generation unit 35.

Figure 19A:
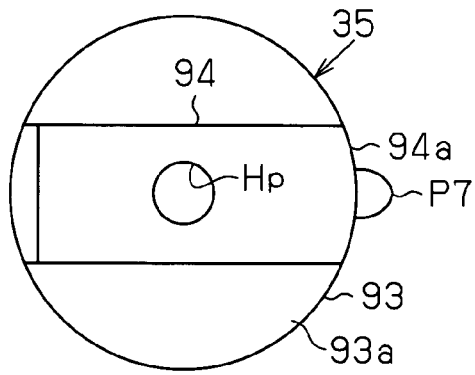
FIGS. 19A, 19B, 19C, and 19D are respectively a plan view, a side view, a bottom view, and a cross-sectional view of a click generation unit in the eighth embodiment.
Figure 19B:
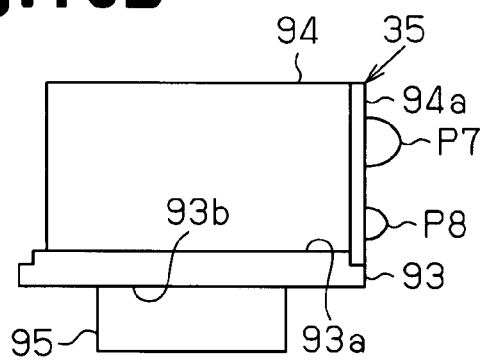

As shown in FIGS. 19A and 19B, the click generation unit 35 includes a base member 93 and a body member 94. The base member 93 is disk-shaped. The body member 94 is fixed to an upper surface 93a of the base member 93.

Figure 19C:
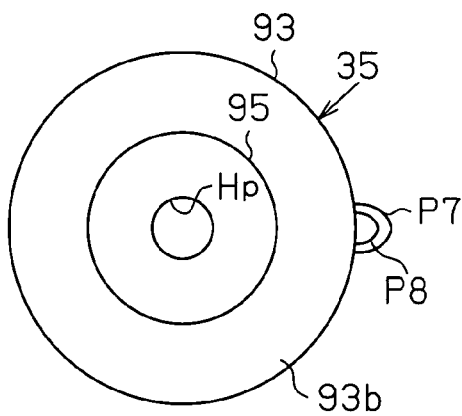

As shown in FIGS. 19B and 19C, a projection 95 projects from a central portion of a lower surface 93b of the base member 93. The projection 95 is arranged in a circular recess 31c formed in an upper surface M of the electromagnet 31 (refer to FIG. 18). The base member 93 (projection 95) is made of metal (iron in the eighth embodiment).

Figure 19D:
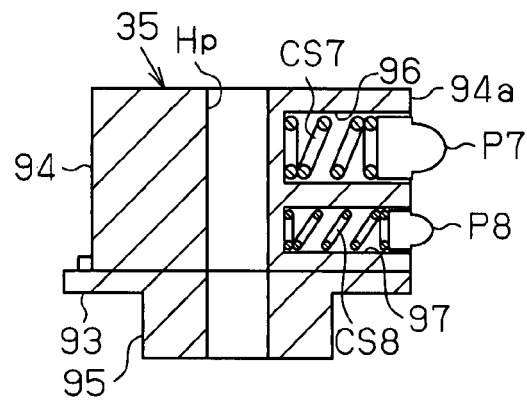

As shown in FIG. 19D, two receptacles 96 and 97 are formed in parallel in a side surface 94a of the body member 94. A seventh coil spring CS7 and a seventh plunger P7, which functions as a projection, are arranged in the receptacle 96. An eighth coil spring CS8 and an eighth plunger P8, which functions as a projection, are arranged in the receptacle 97. The coil springs CS7 and CS8 arranged in the receptacles 96 and 97 bias the corresponding plungers P7 and P8 in a lateral direction (to the right in FIG. 19D).

The spring constant of the seventh coil spring CS7 is greater than the spring constant of the eighth coil spring CS8. Thus, the load required to move the seventh plunger P7 is greater than the load required to move the eighth plunger P8.

A through hole Hp extends through the base member 93 and the body member 94 for insertion of the shaft 32.

Figure 20A:
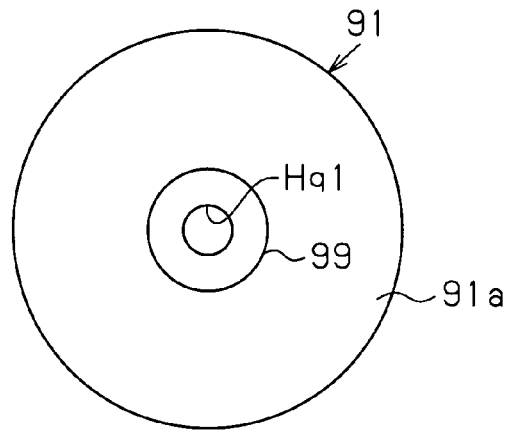
FIGS. 20A, 20B, 20C, and 20D are respectively a plan view, a side view, a bottom view, and a cross-sectional view of a first support in the eighth embodiment.
Figure 20B:
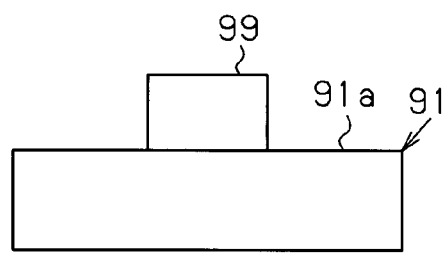
Figure 20D:
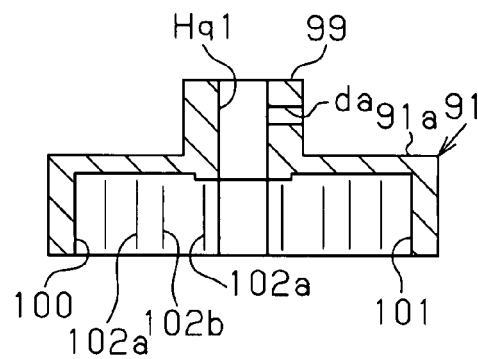

As shown in FIGS. 20A and 20B, the first support 91 is disk-shaped and has a central hole Hq1. The central hole Hq1 is in communication with a through hole Hp formed in the click generation unit 35. A fixed member 99, which is connected to the shaft 32, in an immovable manner is formed on an upper surface 91a of the first support 91. Referring to FIG. 20D, a threaded hole da, which is in communication with the central hole Hq1, extends through a side wall of the fixed member 99. A screw Q1 (refer to FIG. 18) is mated with the threaded hole da so that the screw Q1 becomes engaged with the shaft 32. As a result, the first support 91 is fixed to the shaft 32 so as to rotate integrally with the shaft 32.

Figure 20C:
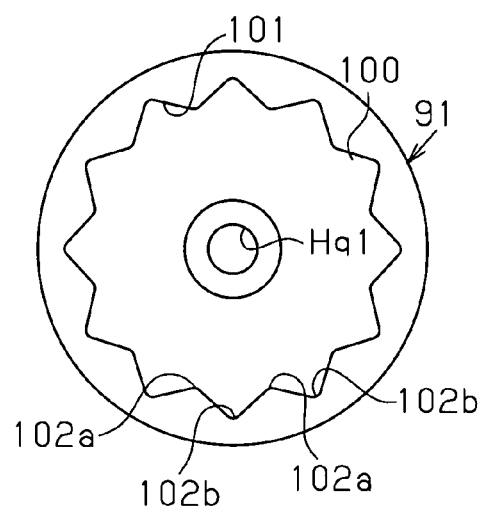

As shown in FIGS. 20C and 20D, the first support 91 has a lower recess 100. The lower recess 100 accommodates a portion of the body member 94 (the portion including the seventh plunger P7. Ridges 102a and valleys 102b are alternately formed on an inner circumferential surface 101 of the lower recess 100 at a predetermined pitch. The valleys 102b function as recesses. Referring to FIG. 18, the seventh plunger P7 elastically presses the ridges 102a and the valleys 102b.

Figure 21A:
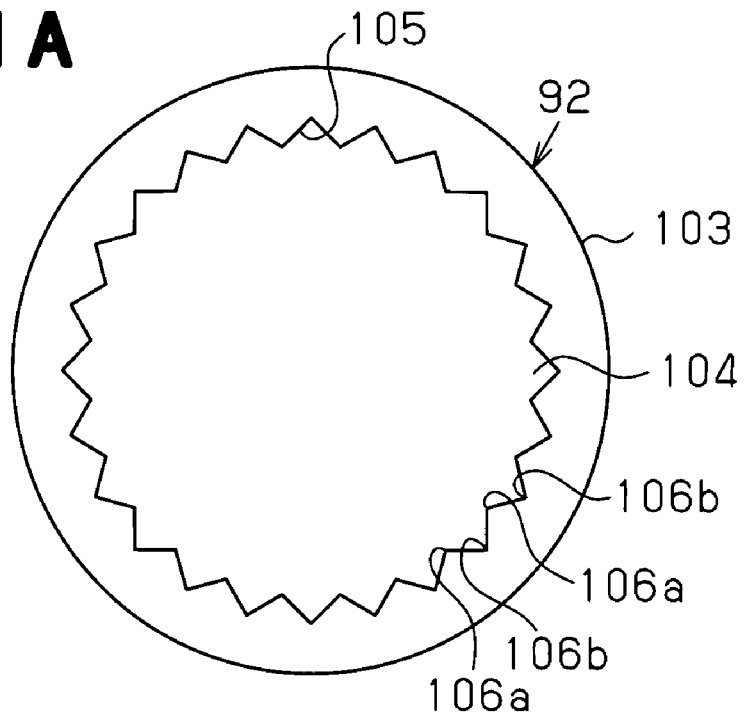
FIGS. 21A and 21B are respectively a bottom view and a cross-sectional view of a second support in the eighth embodiment.
Figure 21B:
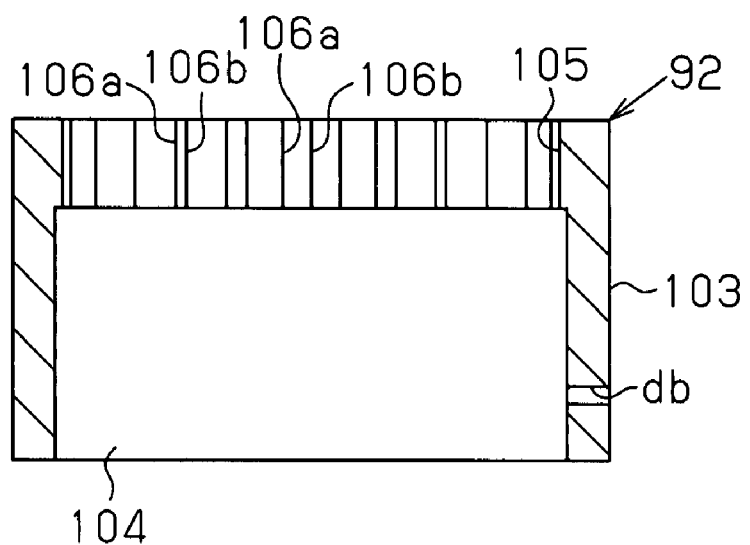

As shown in FIGS. 21A and 21B, the second support 92 is tubular and has an internal space 104 for accommodating a portion of the body member 94 (the portion including the eighth plunger P8) and the entire electromagnet 31. The second support 92 is fixed to the electromagnet 31. A threaded hole db, which is in communication with the internal space 104, extends through the side wall 103 of the second support 92 in the eighth embodiment as shown in FIG. 21B. A screw Q2 (refer to FIG. 18) is mated with the threaded hole db so that the screw Q2 becomes engaged with the electromagnet 31. This fixes the second support 92 to the electromagnet 31.

Ridges 106a and valleys 106b are alternately formed with a predetermined pitch on an upper inner circumferential portion 105 of the second support 92. The valleys 106b function as recesses. The pitch of the ridges 106a (valleys 106b) differs from the pitch of the ridges 102a (valleys 102b) formed on the first support 91. In the eighth embodiment, the pitch of the ridges 106a (valleys 106b) of the second support 92 is smaller than the pitch of the ridges 102a (valleys 102b) of the first support 91. Referring to FIG. 18, the eighth plunger P8 elastically presses the ridges 106a and the valleys 106b formed on the second support 92.

In the switch device 1G, when current is not supplied to a coil 31b of the electromagnet 31 and the electromagnet 31 is inactivated, the click generation unit 35 is not attracted to the electromagnet 31 and is rotatable. When turning the knob 33 to rotate the shaft 32 in this state, the first support 91, which is fixed to the shaft 32, rotates integrally with the shaft 32. Further, the seventh plunger P7 abuts against a ridge 102a (or valley 102b) of the first support 91. The eighth plunger P8 abuts against a ridge 106a (or valley 106b) of the second support 92. However, the spring constant of the seventh coil spring CS7 is greater than the spring constant of the eighth coil spring CS8. Thus, the seventh plunger P7 abuts against (elastically pressed against) a ridge 102a (valley 102b) of the first support 91 with a force greater than the force with which the eighth plunger P8 abuts against (elastically pressed against) a ridge 106a (valley 106b) of the second support 92.

Thus, the seventh plunger P7 does not move over the ridges 102a of the first support 91 and rotates integrally with the click generation unit 35. The eighth plunger P8 moves over the ridges 106a of the second support 92. As a result, the operation of the rotary knob 34 produces clicks at a frequency that is in accordance with the pitch of the ridges 106a and the valleys 106b formed on the second support 92.

When current is supplied to the coil 31b of the electromagnet 31, the electromagnet 31 is activated to generate a magnetic field. Thus, the base member 93 of the click generation unit 35 is attracted to the electromagnet 31. This prohibits rotation of the click generation unit 35. When turning the knob 33 to rotate the shaft 32 in this state, the eighth plunger P8 of the click generation unit 35 does not move over the ridges 106a of the second support 92, which is fixed to the electromagnet 31. However, the seventh plunger P7 moves over the ridges 102a of the first support 91. As a result, the operation of the rotary knob 34 produces clicks at a frequency that is in accordance with the pitch of the ridges 102*a* and the valleys 102*b* formed on the first support 91.

In this manner, by activating and inactivating the electromagnet 31, the tactile sensation of the shaft 32 (knob 33) is adjusted or changed between the two different states.

The eighth embodiment has the advantages described below.

(1) The seventh and eighth plungers P7 and P8 are arranged in the click generation unit 35. The first support 91, which has the ridges 102*a* and the valleys 102*b* that come in contact with the seventh plunger P7, is immovably fixed to the shaft 32. Further, the second support 92, which has the ridges 106*a* and the valleys 106*b* that come in contact with the eighth plunger P8 of the click generation unit 35, is immovably fixed to the electromagnet 31.

Accordingly, the shaft 32 (knob 33) produces clicks with the seventh plunger P7 at a frequency that is in accordance with the pitch of the ridges 102*a* and the valleys 102*b* formed on the first support 91 when the electromagnet 31 is activated. Further, the shaft 32 (knob 33) is produces clicks with the eighth plunger P8 at a frequency that is in accordance with the pitch of the ridges 106*a* and the valleys 106*b* formed on the second support 92 when the electromagnet 31 is inactivated.

It should be apparent to those skilled in the art that the present invention may be embodied in many other specific forms without departing from the spirit or scope of the invention. Particularly, it should be understood that the present invention may be embodied in the following forms.

In the first embodiment, the CPU of the switch control circuit 16 adjusts the strength of the magnetic field H of the electromagnet 9 to control the interval at which the clicks are produced by the rotary knob 2. However, the present invention is not limited in such a manner. For example, the CPU of the switch control circuit 16 may activate and inactivate the electromagnet 9 so as to control the rotary knob 2 between a state in which clicks are produced and a state in which clicks are not produced.

When the switch device has a plurality of the rotary knobs 2 and 34, the clicks produced by the rotary knobs 2 and 34 are not required to have the same tactile sensation. Each of the rotary knobs 2 and 34 may produce clicks having a different tactile sensation.

In the click mechanism 10, the dimples 11 do not necessarily have to be arranged on the click generation unit 7, and the plunger 13 does not necessarily have to be arranged in the support 8. Instead, the plunger 13 may be arranged in the click generation unit 7 and the dimples 11 may be arranged on the support 8.

Each of the switch devices 1, 1A, 1B, 1C, 1D, 1E, 1F, and 1G does not have to be a rotary switch and may be a slide switch that performs switching by sliding a lever.

The dimple 11 may have any shape as long as it can be engaged with the plunger 13. The plunger 13 does not have to be cylindrical as long as it can be engaged with the dimple 11.

The tactile sensation of the clicks produced by the rotary knobs 2 and 34 does not have to be switched in accordance with the screen displayed on the display 21. For example, the tactile sensation of clicks produced by the rotary knob 2 may be switched in accordance with the operation of a mode switch for a car navigation system.

Figure 22A:
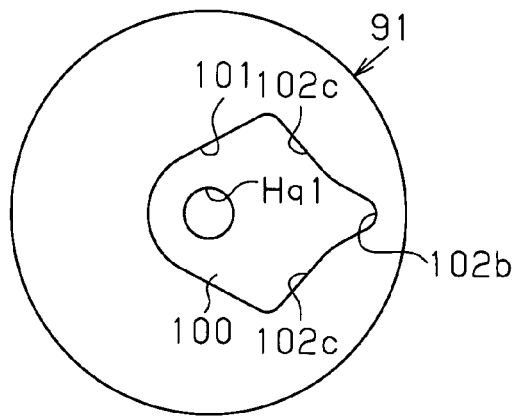
FIGS. 22A, 22B, and 23 show modifications of supports.
Figure 22B:
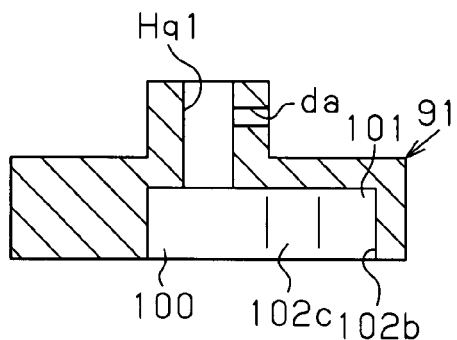

In the eighth embodiment, the ridges 102*a* and the valleys 102*b* are arranged alternately on the entire inner circumferential surface 101 of the first support 91. However, the present invention is not limited in such a manner. For example, as shown in FIGS. 22A and 22B, a single valley 102*b* and a slope 102*c* formed on each side of the valley 102*b* may be formed on the inner circumferential surface 101. The slopes 102 are form continuously and smoothly from the valley 102*b*. With this structure, when a shaft 32 (knob 33) is rotated while an electromagnet 31 is activated, the seventh plunger P7 applies a force to the shaft 32 (knob 33) acting to return to the valley 102*b* after rotating along a slope 102*c*. This structure enables the rotary knob 34 to provided the rotary knob 34 with a tactile sensation produced by the automatic returning of the rotary knob 34 to a predetermined position.

Figure 23:
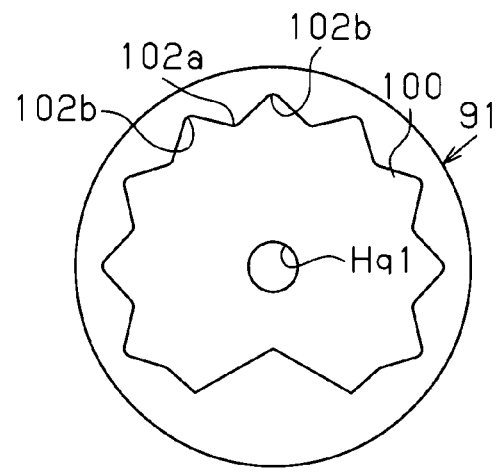

In the eighth embodiment, the first support 91 has the ridges 102*a* and the valley 102*b* arranged alternately on the entire inner circumferential surface 101. However, the present invention is not limited to such a structure. For example, the ridges 102*a* and valleys 102*b* do not have to be formed on the entire inner circumferential surface and may be formed alternately only within a predetermined range as shown in FIG. 23. With this structure, when the electromagnet 31 is activated, the rotary knob 34 produces clicks in accordance with the pitch of the ridges 102*a* and the valleys 102*b* only within the range in which the ridges 102*a* and the valleys 102*b* are formed.

The application of the switch devices 1, 1A, 1B, 1C, 1D, 1E, 1F, and 1G is not limited to car navigation systems. The switch devices 1, 1A, 1B, 1C, 1D, 1E, 1F, and 1G may be applied to other apparatuses such as audio systems. Further, the application of the switch devices 1, 1A, 1B, 1C, 1D, 1E, 1F, and 1G is not limited to apparatuses for vehicles. The switch devices 1, 1A, 1B, 1C, 1D, 1E, 1F, and 1G may be applied to other types of apparatuses such as electric home appliances.

The present examples and embodiments are to be considered as illustrative and not restrictive, and the invention is not to be limited to the details given herein, but may be modified within the scope and equivalence of the appended claims.

What is claimed is:

1. A switch device for use by a person with an apparatus having an actuation state, the switch comprising:
    a knob operable for switching the actuation state of the apparatus;
    a click mechanism connected to the knob and including a recess, a projection, and a biasing member generating biasing force that engages the projection with the recess, in which engagement of the projection and the recess according to the biasing force of the biasing member provides a tactile sensation to the person operating the knob when the knob is operated; and
    an adjustment mechanism for generating a magnetic field that displaces the click mechanism in the same direction as the biasing force generated by the biasing member of the click mechanism to adjust the tactile sensation of the click mechanism.

2. The switch device according to claim 1, further comprising:
    a control means for controlling generation of the magnetic field with the adjustment mechanism.

3. The switch device according to claim 1, wherein the adjustment mechanism includes
    a magnetic body including either one of the recess and the projection of the click mechanism and connected to the knob by the click mechanism; and
    an electromagnet for generating the magnetic field and attracting the magnetic body to provide a tactile sensation to the knob.

4. The switch device according to claim 1, wherein the adjustment mechanism includes:
    a magnetic body including either one of the recess and the projection of the click mechanism and connected to the knob by the click mechanism; and an electromagnet for inducing the magnetic field toward the magnetic body and varying the tactile sensation produced by the click mechanism in accordance with the degree the magnetic field attracts the magnetic body.

5. The switch device according to claim 1, wherein the switch device is a rotary switch device, and the knob is rotated about a shaft.

6. The switch device according to claim 1, wherein the apparatus has a plurality of actuation modes, and the control means varies the tactile sensation produced by the click mechanism when the apparatus switches actuation modes in accordance with the actuation mode subsequent to the switching.

7. The switch device according to claim 6, wherein the apparatus includes a display for selectively displaying a plurality of screens, and the control means varies the tactile sensation produced by the click mechanism when the display switches screens in accordance with the screen subsequent to the switching.

8. A rotary switch device comprising:
    a case;
    a rotary knob;
    a shaft rotatable together with the rotary knob;
    a first rotation member connected to the shaft, arranged in the case, and rotatable integrally with the shaft;
    a second rotation member facing the first rotation member and arranged coaxially with the first rotation member in the case;
    an electromagnet fixed to the case and magnetically restraining the second rotation member when activated to prohibit rotation of the second rotation member; and
    a click mechanism, arranged between the first rotation member and the second rotation member, for generating resistance force that provides a tactile sensation via the rotary knob when the rotary knob is operated;
    wherein the click mechanism enables the second rotation member to rotate together with the first rotation member when the electromagnet is inactivated, and the click mechanism permits the first rotation member to rotate relative to the second rotation member when an external force exceeding the resistance force of the click mechanism is applied to the first rotation member when the electromagnet is activated.

9. The rotary switch device according to claim 8, wherein the click mechanism includes:
    a plurality of recesses formed on the first rotation member; and
    a plunger arranged on the second rotation member; wherein when the rotary knob is rotated by a force exceeding resistance force generated by engagement of the plunger with one of the recesses, the plunger is disengaged from said recess.

10. The rotary switch device according to claim 9, wherein the plurality of recesses are a plurality of dimples arranged along an arc.

11. The rotary switch device according to claim 8, wherein the click mechanism includes:
    a plunger arranged on the first rotation member; and a plurality of recesses formed on the second rotation member; and
    wherein when the rotary knob is rotated by a force exceeding resistance force generated by engagement of the plunger with one of the recesses, the plunger is disengaged from said recess.

12. The rotary switch device according to claim 11, wherein the plurality of recesses are a plurality of radially extending grooves.

13. The rotary switch device according to claim 8, wherein the click mechanism includes:
    a plurality of first recesses;
    a first plunger, arranged on either one of the first rotation member and the second rotation member, for elastically pressing the plurality of first recesses;
    a plurality of second recesses;
    a second plunger, arranged on either one of the first rotation member and the second rotation member, for elastically pressing the plurality of second recesses; and coil springs having different spring constants for
    respectively pressing the first and second plungers against the corresponding recesses.

14. The rotary switch device according to claim 8, wherein the second rotation member is formed from a magnetic material, and the first rotation member is formed from a non-magnetic material.

15. The rotary switch device according to claim 14, wherein the electromagnet magnetically attracts the second rotation member in a selective manner without attracting the first rotation member.

16. The rotary switch device according to claim 8, wherein the switch device is connected to a control circuit for activating and inactivating the electromagnet.

17. The rotary switch device according to claim 1, wherein the knob including a shaft, the biasing member generates the biasing force in an axial direction of the shaft, and the adjustment mechanism generates the magnetic field that displaces the click mechanism in the axial direction of the shaft.

* * * * *